(12) United States Patent
Ogawa et al.

(10) Patent No.: US 11,512,526 B2
(45) Date of Patent: Nov. 29, 2022

(54) FUNCTIONAL MEMBER-ATTACHED GLASS WINDOW

(71) Applicants: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

(72) Inventors: Mayu Ogawa, Tokyo (JP); Mitsuo Fukuda, Tokyo (JP); Masahiro Matsumura, Tokyo (JP); Akira Saito, Tokyo (JP)

(73) Assignees: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

( * ) Notice: Subject to any disclaimer, the term of this patent is extended or adjusted under 35 U.S.C. 154(b) by 50 days.

(21) Appl. No.: 17/099,067

(22) Filed: Nov. 16, 2020

(65) Prior Publication Data
US 2021/0062572 A1 Mar. 4, 2021

Related U.S. Application Data

(63) Continuation of application No. PCT/JP2019/020409, filed on May 23, 2019.

(30) Foreign Application Priority Data

May 31, 2018 (JP) .............................. JP2018-104613
Feb. 5, 2019 (JP) .............................. JP2019-018856

(51) Int. Cl.
*E06B 7/28* (2006.01)
*H01Q 1/12* (2006.01)
*H01Q 1/27* (2006.01)

(52) U.S. Cl.
CPC ...... *E06B 7/28* (2013.01); *H01Q 1/27* (2013.01)

(58) Field of Classification Search
CPC .............................. E06B 7/28; H01Q 1/1271
See application file for complete search history.

(56) References Cited

U.S. PATENT DOCUMENTS 2,200,674 A * 5/1940 McDonald, Jr. ......... H01Q 7/00
343/866
3,760,541 A * 9/1973 Fulcher ..................... E06B 7/28
52/84

(Continued)

FOREIGN PATENT DOCUMENTS

JP H0223390 A * 1/1990
JP 6-44216 U 6/1994

(Continued)

OTHER PUBLICATIONS

EPO Search Report and Written Opinion for counterpart Application No. 19811644.4 (9 pages). (Year: 2022).*

(Continued)

*Primary Examiner* — Rodney Mintz
(74) *Attorney, Agent, or Firm* — Oblon, McClelland, Maier & Neustadt, L.L.P.

(57) ABSTRACT

A functional member-attached glass window includes a glass window to be erected on a floor surface and having a glass plate, and a functional member having a surface area smaller than that of the glass plate and arranged at a position apart from and higher than the floor surface, wherein the functional member is pasted to the glass plate via a spacer and joined to the spacer with a fastening part.

25 Claims, 22 Drawing Sheets

(56) References Cited

U.S. PATENT DOCUMENTS

| | | | | |
|---|---|---|---|---|
| 3,834,077 A | * | 9/1974 | Meyer .................... | E06B 7/28 |
| | | | | 49/70 |
| 6,005,529 A | * | 12/1999 | Hutchinson ............. | H01Q 1/12 |
| | | | | 343/702 |
| 11,165,135 B2 | * | 11/2021 | Hiramatsu ........ | B32B 17/10201 |
| 2020/0161741 A1 | * | 5/2020 | Hiramatsu ........ | B32B 17/10005 |

FOREIGN PATENT DOCUMENTS

| | | | |
|---|---|---|---|
| JP | H10256936 A | * | 9/1998 |
| JP | 2002305406 A | * | 10/2002 |
| JP | 2012-140766 A | | 7/2012 |
| JP | 2012-148966 A | | 8/2012 |
| JP | 2013-88634 A | | 5/2013 |
| JP | 2016-42119 A | | 3/2016 |
| RU | 2 368 876 C1 | | 9/2009 |

OTHER PUBLICATIONS

English Translation of the Written Opinion for PCT/JP2019/020409 (5 pages). (Year: 2020).*

* cited by examiner

FUNCTIONAL MEMBER-ATTACHED GLASS WINDOW

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2019/020409 filed on May 23, 2019 and designating the U.S., which claims priority to Japanese Patent Application No. 2018-104613 filed on May 31, 2018, and Japanese Patent Application No. 2019-018856 filed on Feb. 5, 2019. The entire contents of the foregoing applications are incorporated herein by reference.

BACKGROUND OF THE INVENTION

1. Field of the Invention

The present invention relates to a functional member-attached glass window.

2. Description of the Related Art

Insulating glazing has been achieved with the use of an existing glass window. For example, PTL 1 and PTL 2 disclose insulated glazing obtained by adhering (pasting), with butyl rubber, a spacer-attached glass plate to a glass plate of an existing glass window.

Such a spacer-attached glass plate is placed on a setting block with the principal surface being almost vertical, and spacers are joined to the glass plate of the glass window with butyl rubber, so that the spacer-attached glass plate is pasted to the glass plate of the glass window.

CITATION LIST

Patent Literature

[PTL 1] Japanese Laid-Open Patent Publication No. 2012-140766
[PTL 2] Japanese Laid-Open Patent Publication No. 2012-148966

SUMMARY OF THE INVENTION

The insulated glazing disclosed in PTL 1 and PTL 2 includes the spacer-attached glass plate having an area substantially equal to the area of the glass plate of the glass window (i.e., the area of the principal surface of the glass plate; the same applies to the following cases). Therefore when the bottom of the spacer-attached glass plate with the principal surface arranged almost vertical is placed on a setting block, the spacer-attached glass plate is accurately attached to the glass plate of the glass window.

However, when a member having a surface area smaller than that of the glass plate of the glass window (hereinafter referred to as a small member) is attached to the glass plate, in particular, when only the small member is attached to an upper part of the glass plate, it is difficult to paste the small member using the setting block. In such a case, the small member is fixed to the glass window with only an adhesive such as butyl rubber.

In recent years, it has been suggested to use a glass plate of an existing glass window as a support member for supporting an antenna or a display apparatus by pasting, to the glass plate of the glass window, a functional member such as a small antenna unit having an antenna function (i.e., a function for transmitting and receiving electromagnetic waves) or a small display apparatus for displaying images.

Such a functional member is often arranged on an upper part of the glass plate of the glass window in order to improve the efficiency of transmission and reception of electromagnetic waves in the case of an antenna unit, or in order to improve the visibility of the displayed images in the case of a display apparatus. In such cases, the functional member is pasted to the glass plate via a spacer having a triangular or trapezoidal shape in a plan view.

However, in the above case, for example, when a large amount of stress is generated in the spacer due to an earthquake, the functional member attached to the spacer may peel off from the spacer.

The present invention has been made in view of such circumstances, and it is a main object of the present invention to provide a functional member-attached glass window in which a functional member having an area smaller than the glass plate of the glass window is stably arranged on an upper part of the glass plate.

Solution to Problem

In order to achieve an object of the present invention, provided is a functional member-attached glass window including a glass window to be erected on a floor surface and having a glass plate, and a functional member having a surface area smaller than that of the glass plate and arranged at a position apart from and higher than the floor surface, wherein the functional member is pasted to the glass plate via a spacer and joined to the spacer with a fastening part.

Advantageous Effects of Invention

According to the present invention, a functional member having an area smaller than the glass plate of the glass window is stably arranged on an upper part of the glass plate.

DETAILED DESCRIPTION OF THE PREFERRED EMBODIMENTS

Hereinafter, a preferred embodiment of a functional member-attached glass window according to the present invention will be described with reference to the attached drawings.

First Embodiment

Figure 1:
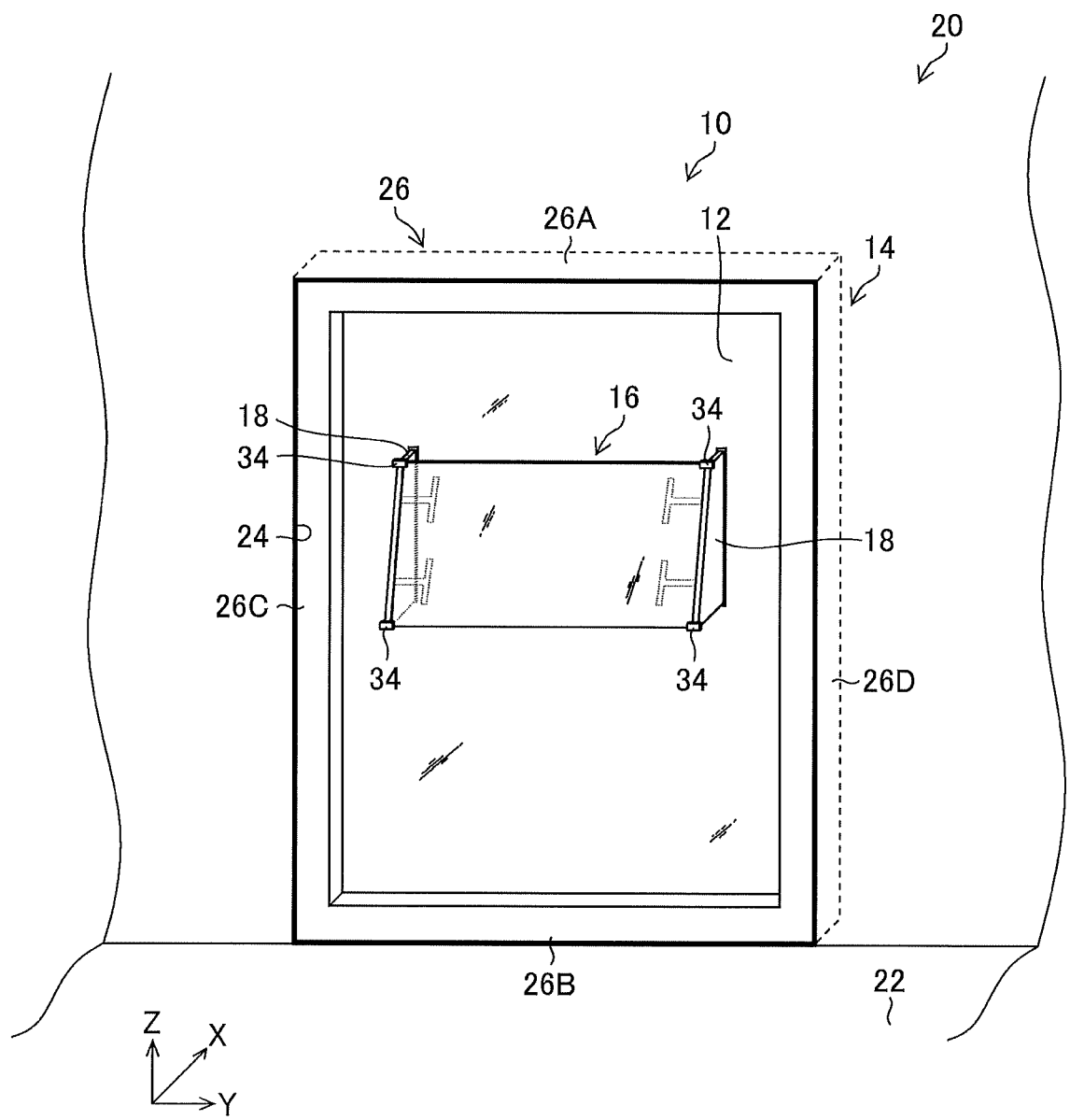
FIG. 1 is a perspective view of a functional member-attached glass window according to an embodiment as seen from an indoor side of a building.

FIG. 1 is a perspective view of a functional member-attached glass window 10 according to a first embodiment as seen from an indoor side of a building 20.

The functional member-attached glass window 10 as illustrated in FIG. 1 includes: a glass window 14 having a glass plate 12; and an antenna unit 16. The functional member-attached glass window 10 is constructed by pasting the antenna unit 16 to the glass plate 12 with a pair of spacers 18, 18. The X direction explained below refers to the thickness direction of the glass plate 12. The Y direction refers to a direction orthogonal to the X direction and is the width direction (horizontal direction) of the glass plate 12. The Z direction is a direction orthogonal to the X direction and the Y direction and is the height direction of the glass plate 12. In the embodiment, the vertical direction is explained as an example of the Z direction, but the Z direction does not indicate only the strictly vertical direction. The Z direction may be a direction slightly inclined with respect to the strictly vertical direction.

The glass window 14 according to the embodiment is an existing window vertically installed in the Z direction on a floor surface 22 of the building 20 in an opening 24 of the building 20. The glass window 14 includes a rectangular glass plate 12 and a sash 26 made of metal attached to vertical edge portions and horizontal edge portions of the glass plate 12. The glass plate 12 may be either a single glass plate, insulated glazing, or laminated glass. The sash 26 is a known sash configured to be in a frame shape including an upper horizontal frame 26A and a lower horizontal frame 26B in the Y direction and a left vertical frame 26C and a right vertical frame 26D in the Z direction.

Figure 2:
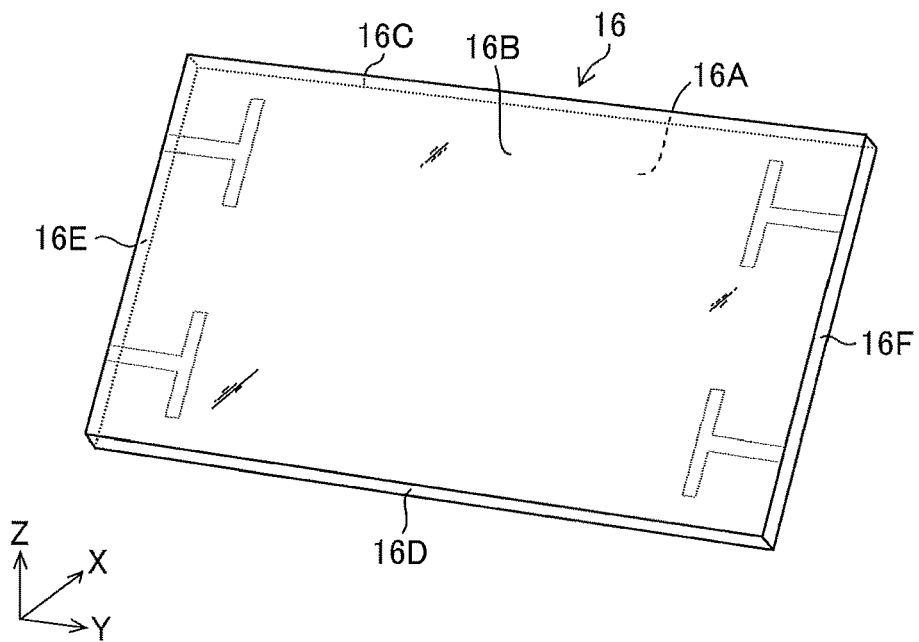
FIG. 2 is a perspective view of an antenna unit alone as seen from the front.

The antenna unit 16 according to the embodiment is an example of a functional member that is a constituent element of the present invention. As illustrated in the front perspective view of FIG. 2, this antenna unit 16 is mainly constituted by a plate made of glass in a rectangular shape in a plan view, and includes front and back principal surfaces 16A, 16B, an upper edge surface 16C, a lower edge surface 16D, a left edge surface 16E, and a right edge surface 16F. As illustrated in FIG. 1, the antenna unit 16 is configured to have a smaller area than the glass plate 12, and the arrangement position of the antenna unit 16 is set to a high position on the glass plate 12 due to the sensitivity for transmission and reception of electromagnetic waves.

The high position on the glass plate 12, which is the arrangement position of the antenna unit 16, is not particularly meant to strictly designate the position where the antenna unit 16 is arranged. For example, with the middle position in the Z direction of the glass plate 12 being adopted as the boundary, an upper side with respect to the middle position may be defined as the high position. Alternatively, with a limit position of pasting with the use of the setting block disclosed in PTL 1, 2 being adopted as a boundary, an upper side with respect to the limit position may be defined as the high position. In other words, the high position on the glass plate 12 means a position spaced apart from the floor surface 22 of the building 20 toward the upper side and being higher than the limit position of pasting with the use of the setting block. In the embodiment, for example, the antenna unit 16 is illustrated in a rectangular shape, but the antenna unit 16 may be, for example, in a shape of a circle such as an ellipse or a perfect circle, or may be in a shape of a polygon other than a square.

Figure 3:
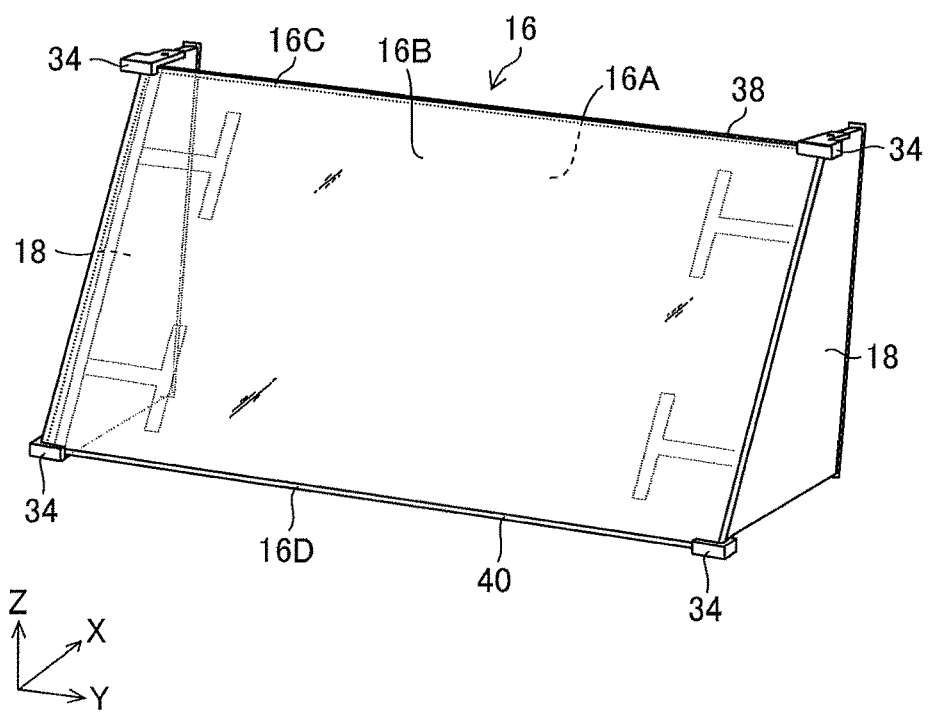
FIG. 3 is a perspective view of the antenna unit as seen from the front.
Figure 4:
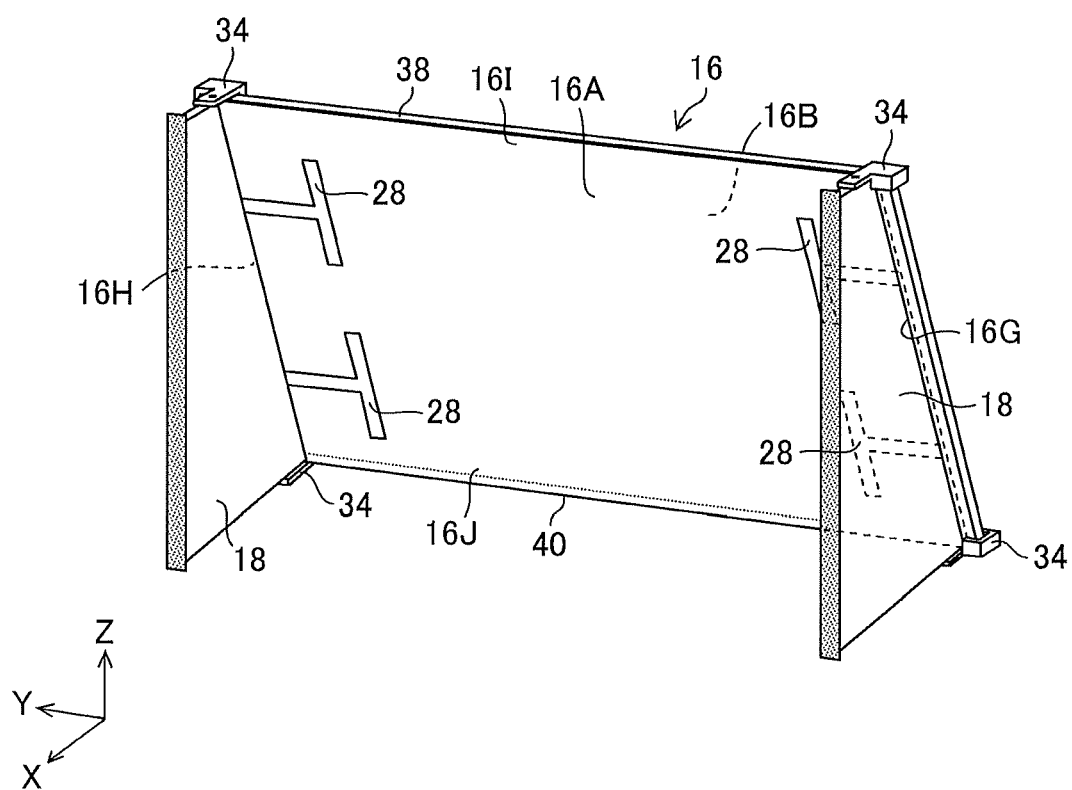
FIG. 4 is a perspective view of the antenna unit as seen from the back.

FIG. 3 is a front perspective view of the antenna unit 16 as seen from the indoor side of FIG. 1. FIG. 4 is a perspective view of a back surface of the antenna unit 16 as seen from the outdoor side of FIG. 1. The antenna unit 16 is pasted to the glass plate 12 with via spacers 18, 18 in such an orientation that a principal surface 16A of FIG. 4 faces the glass plate 12 (see FIG. 1).

As illustrated in FIG. 4, the antenna unit 16 includes an antenna 28 on the principal surface 16A of the antenna unit 16. The antenna 28 is provided by printing a metal material on the principal surface 16A of the antenna unit 16. Examples of metal materials constituting the antenna 28 include conductive materials such as gold, silver, and copper. In addition, the antenna 28 preferably has a light-transmitting property. The antenna 28 having a light-transmitting property is preferable because the light-transmitting property improves the design and can reduce the average solar absorption rate. Conductive traces (not illustrated) are connected to the antenna 28.

In the antenna unit 16, the vertical edge portions 16G, 16H on both of the left and right sides of the principal surface 16A are attached to the glass plate 12 via the pair of spacers 18, 18 described above.

Figure 5:
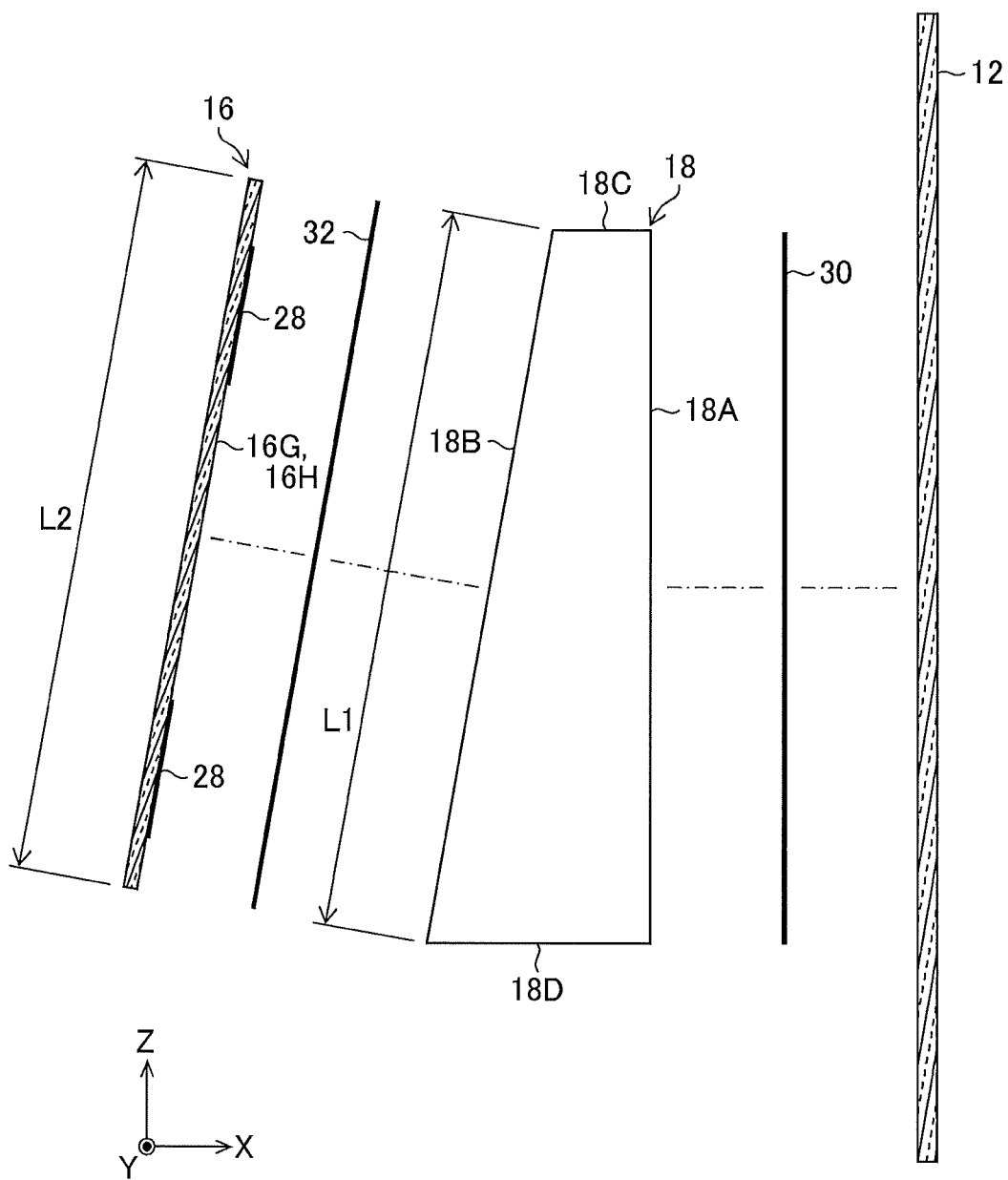
FIG. 5 is an exploded view of the antenna unit arranged on a glass plate.
Figure 6:
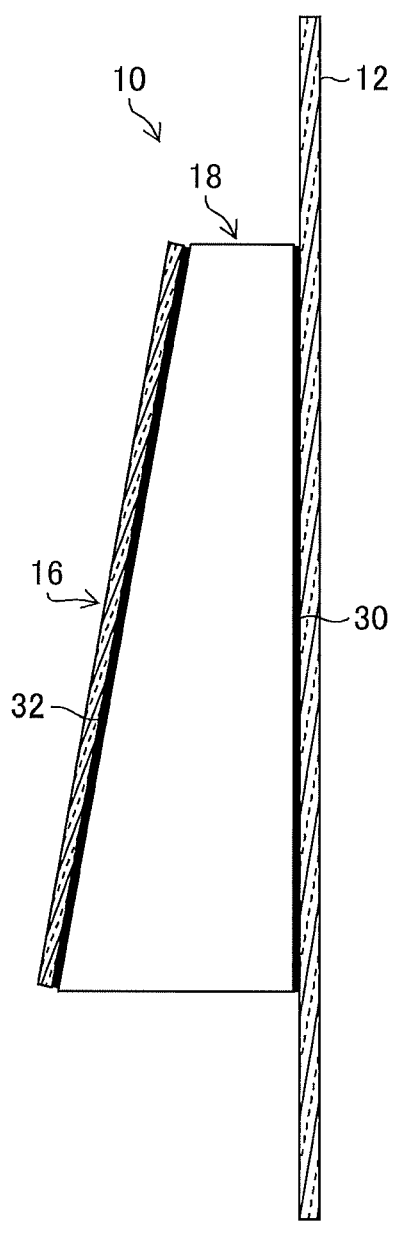
FIG. 6 is a side view of a functional member-attached glass window with the antenna unit being pasted to the glass plate.

FIG. 5 is an assembly drawing of the antenna unit 16 on the glass plate 12. In the side view of FIG. 5, the antenna unit 16 is illustrated as seen from the Y direction. FIG. 6 is a side view of the functional member-attached glass window 10 having the antenna unit 16 pasted to the glass plate 12 as seen from the Y direction.

As seen in FIG. 5, the spacer 18 is a plate configured in a substantially trapezoidal shape in a plan view, and may be made of either resin or metal. Examples of the spacer 18 made of resin include spacers made of AES (acrylonitrile ethylene-propylene-diene styrene), acryl, and polycarbonate. This spacer 18 includes a first end surface 18A facing the glass plate 12, a second end surface 18B facing the antenna unit 16, a third end surface 18C that is an upper edge surface, and a fourth end surface 18D that is a lower edge surface. The spacer 18 includes: the first end surface 18A pasted to the glass plate 12 along the Z direction with butyl tape 30; and the second end surface 18B pasted to the vertical edge portion 16G, 16H of the antenna unit 16 with butyl tape 32. The second end surface 18B is configured such that a length L1 of the second end surface 18B in the Z direction is substantially equal to a length L2 of the vertical edge portions 16G, 16H in the Z direction. Note that the butyl tapes 30, 32 are examples of adhesive agents, but other adhesive agents may also be used instead of the butyl tapes 30, 32. As other adhesive agents, various double sided adhesive tapes can be used. Examples of double sided adhesive tapes include acrylic foam base strong adhesive double sided tapes (e.g., 3M VHB Tape (registered trademark) produced by Sumitomo 3M Limited and HYPER-JOINT (registered trademark) produced by Nitto Denko Corporation).

As illustrated in FIG. 5 and FIG. 6, when the vertical edge portions 16G, 16H of the antenna unit 16 are pasted to the spacers 18, 18 with the butyl tapes 32, 32, and the spacers 18, 18 are pasted to the glass plate 12 with the butyl tapes 30, 30, the principal surface 16A of the antenna unit 16 is arranged in such an orientation that the antenna unit 16 is spaced apart from the glass plate 12 in the X direction and being along the second end surface 18B inclined with respect to the Z direction. In the present embodiment, the principal surface 16A of the antenna unit 16 is arranged to be inclined with respect to the glass plate 12, but the spacers 18, 18 may be formed in a rectangular shape to make the first end surface 18A and the second end surface 18B be parallel with each other, so that the principal surface 16A of the antenna unit 16 may be arranged in parallel with the glass plate 12. In order to improve the sensitivity for transmitting and receiving the electromagnetic waves with the antenna unit 16, the principal surface 16A of the antenna unit 16 is preferably arranged to be inclined with respect to the glass plate 12.

In the present embodiment, the antenna unit 16 is pasted to the glass plate 12 such that the vertical edge portions 16G, 16H on both left and right sides of the principal surface 16A are pasted to the glass plate 12 via the pair of spacers 18, 18, but the antenna unit 16 may be pasted to the glass plate 12 such that the horizontal edge portions 16I, 16J (see FIG. 4) on the upper and lower sides of the principal surface 16A are pasted to the glass plate 12 via the pair of spacers 18, 18, or such that both the vertical edge portions 16G, 16H on the left and right sides of the principal surface 16A and the horizontal edge portions 16I, 16J on the upper and lower sides of the principal surface 16A are pasted to the glass plate 12 with via spacers.

In conventional techniques, the antenna unit 16 is simply pasted to the glass plate 12 with via spacers 18, 18. In such a conventional functional member-attached glass window 10 explained above, for example, the antenna unit 16 may peel off from the spacers 18, 18 when an earthquake occurs and a large amount of stress is generated in the spacers 18, 18.

Therefore, in order to solve the above problem, the functional member-attached glass window 10 according to the first embodiment includes fastening parts 34 as illustrated in FIG. 1 and FIG. 3. Hereinafter, the fastening parts 34 are explained.

As illustrated in FIG. 1 and FIG. 3, the fastening parts 34 are arranged at four respective corner of the antenna unit 16. Since the fastening parts 34 have almost the same configuration, the configuration of the fastening part 34 located in the lower right corner of the antenna unit 16 of FIG. 1 is explained below, and the explanation about the configurations of the other three fastening parts 34 is omitted.

Figure 7:
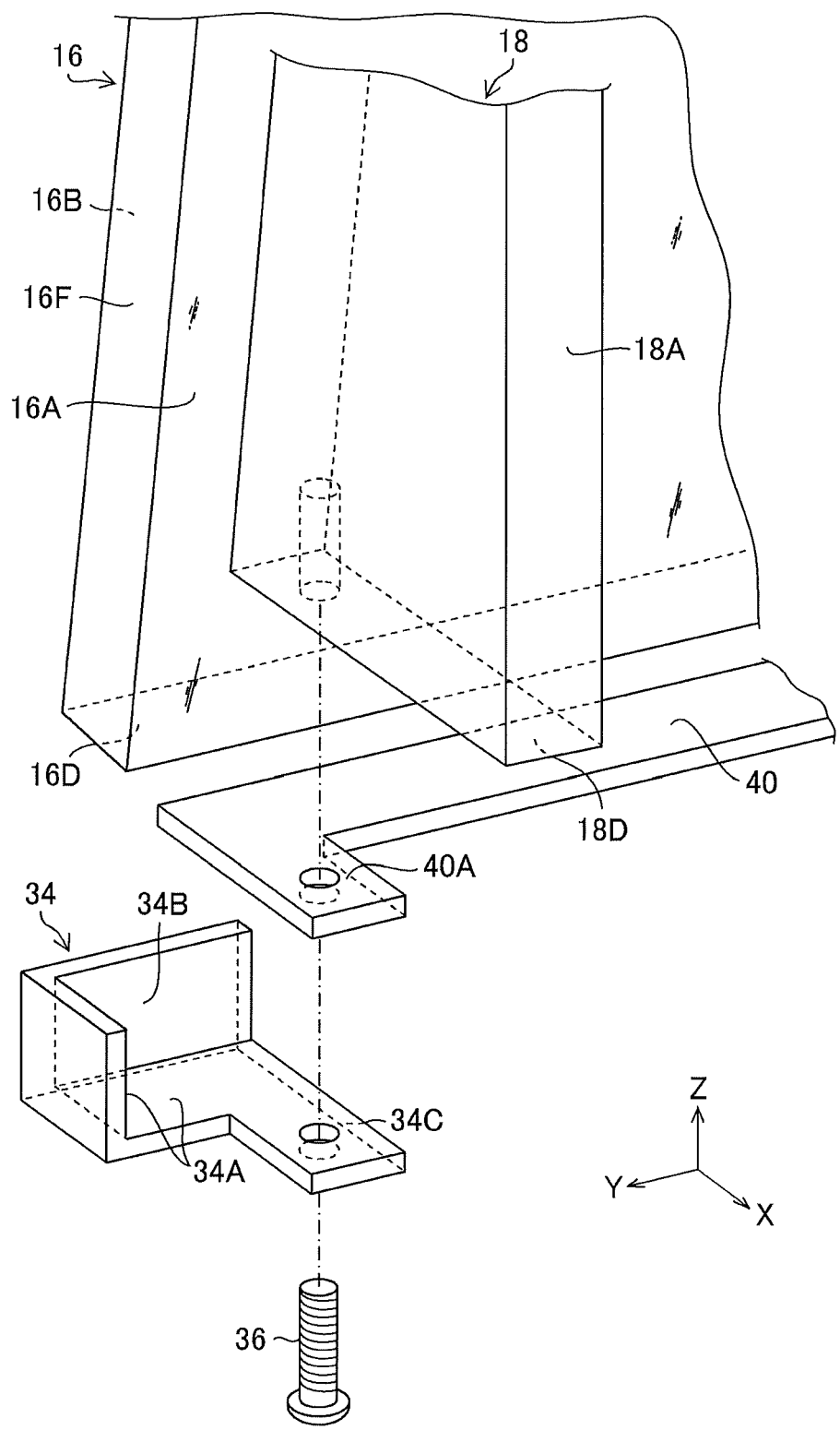
FIG. 7 is a perspective view of a fastening part as seen from the direction of the principal surface of the antenna unit.
Figure 8:
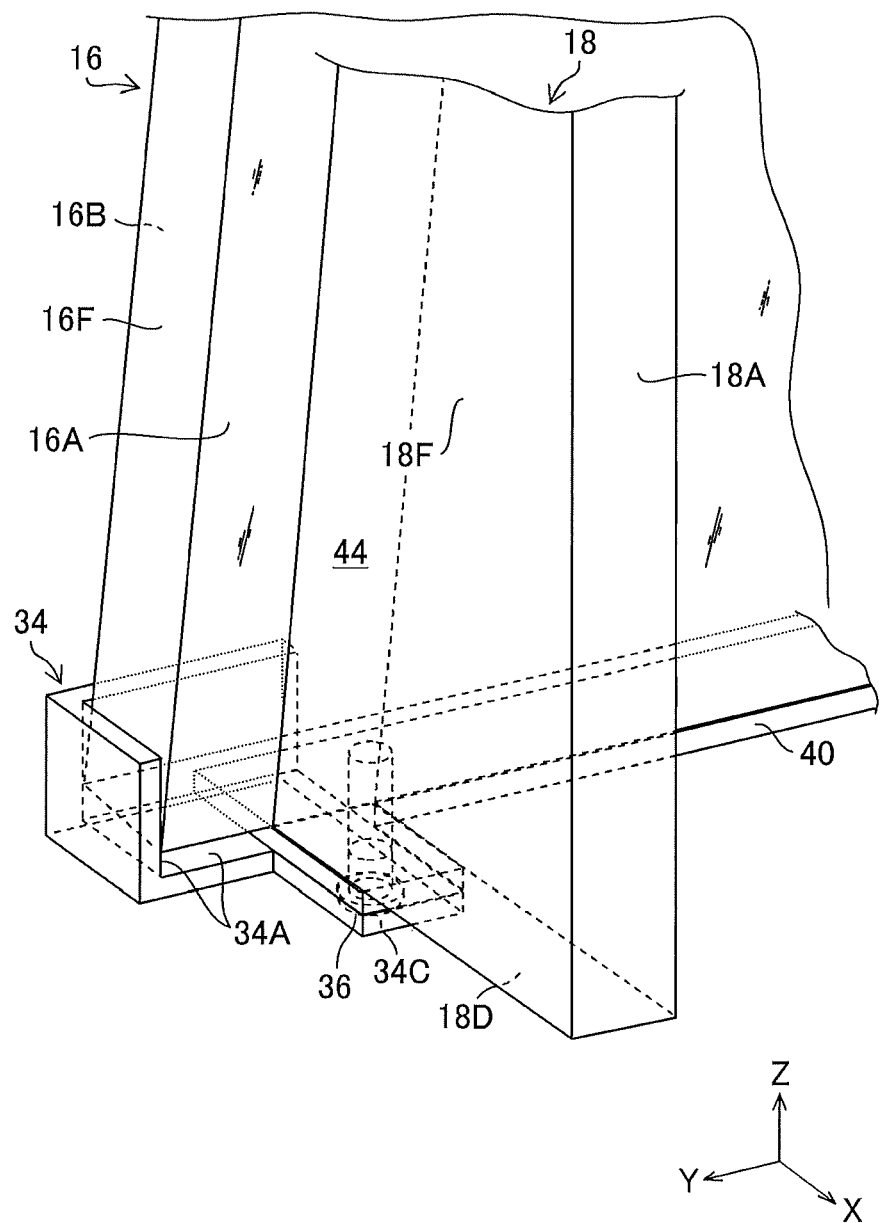
FIG. 8 is a perspective view of a fastening part when the antenna unit is joined to the spacer via the fastening part in FIG. 7.
Figure 9:
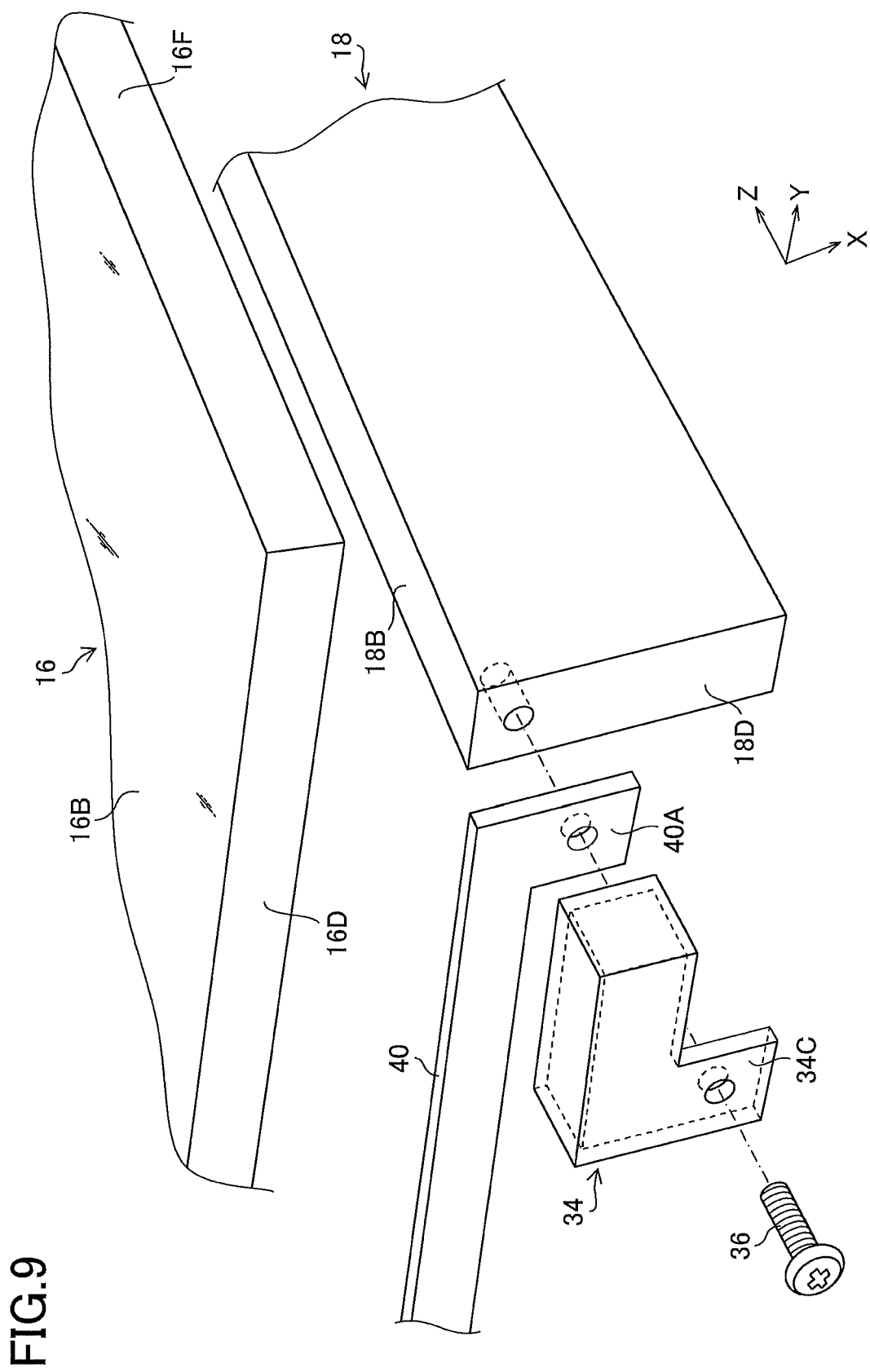
FIG. 9 is a perspective view of a fastening part as seen from a direction of a lower edge surface of the antenna unit.
Figure 10:
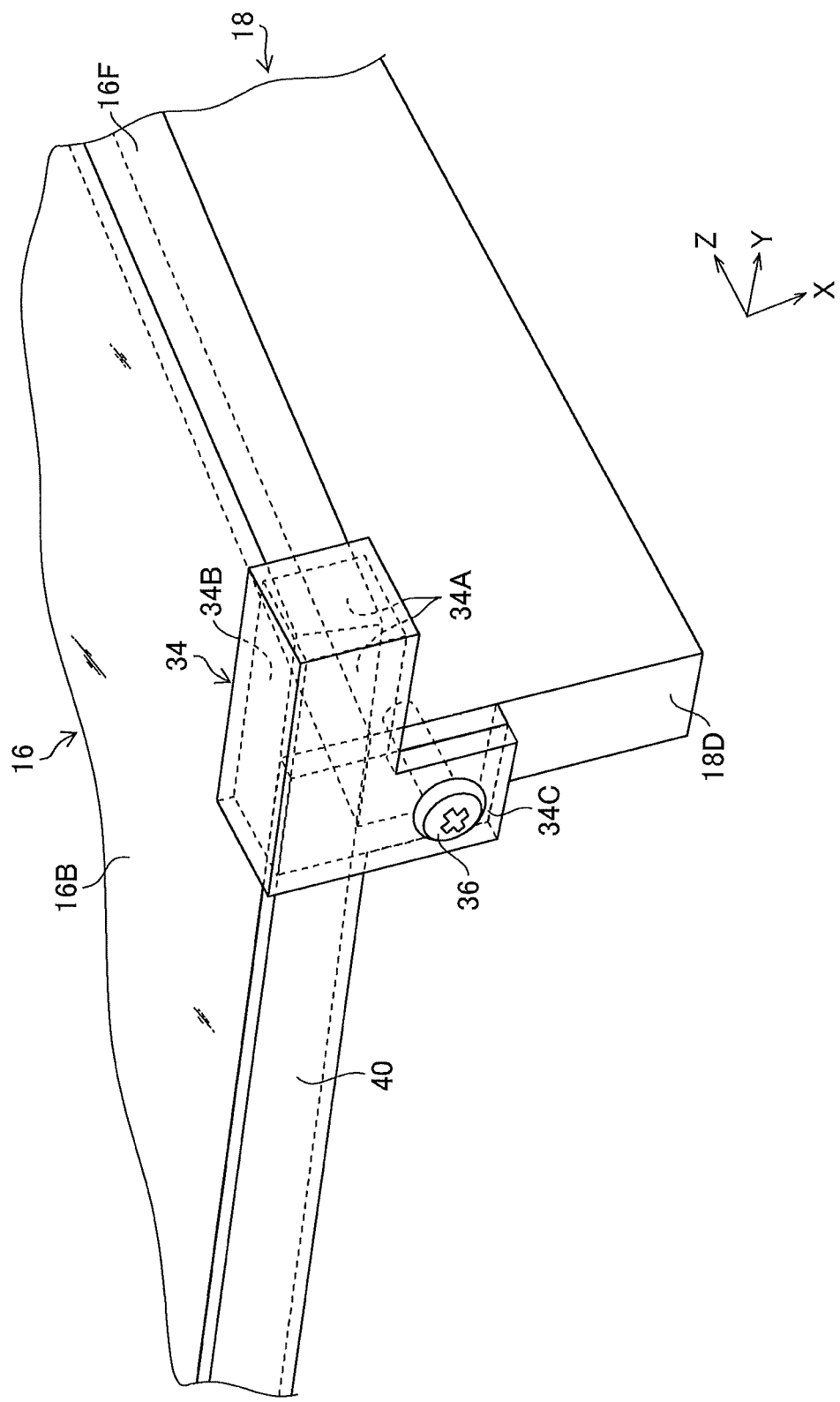
FIG. 10 is a perspective view of a fastening part when the antenna unit is joined to the spacer via the fastening part in FIG. 9.

FIG. 7 is a perspective view of assembly of the fastening part 34 for the antenna unit 16 and the spacer 18. In FIG. 7, the fastening part 34 is illustrated as seen from the side of the principal surface 16A of the antenna unit 16. FIG. 8 is a perspective view illustrating a state in which the antenna unit 16 is bonded to the spacer 18 via the fastening part 34 with respect to the perspective view of assembly illustrated in FIG. 7. FIG. 9 is a perspective view of assembly of the fastening part 34 for the antenna unit 16 and the spacer 18. In FIG. 9, the fastening part 34 is illustrated as seen from the side of the lower edge surface 16D of the antenna unit 16. FIG. 10 is a perspective view illustrating a state in which the antenna unit 16 is joined to the spacer 18 via the fastening part 34 with respect to the perspective view of assembly illustrated in FIG. 9.

The fastening part 34 according to the embodiment includes: a first contact portion 34A in an L shape that comes into contact with the lower edge surface 16D and the right edge surface 16F, i.e., two end surfaces of the antenna unit 16 formed in the XY direction and the XZ direction (see FIG. 7 and FIG. 9) perpendicular to each other; and a second contact portion 34B in a flat plate shape that comes into contact with the principal surface 16B of the antenna unit 16 so that the antenna unit 16 is sandwiched between the second contact portion 34B and the spacer 18. The fastening part 34 includes a joint portion 34C into which a screw 36 is screwed. This joint portion 34C is provided at such a position that, when the first contact portion 34A is brought into contact with the lower edge surface 16D and the right edge surface 16F, and the second contact portion 34B is brought into contact with the principal surface 16B, the joint portion 34C can come into contact with the fourth end surface 18D of the spacer 18 (see FIG. 8 and FIG. 10). Note that the screw 36 is an example of a fastener that is a constituent element of the present invention. For example, the screw 36 may be a machine screw, a self-tapping screw, and the like.

According to the fastening part 34 configured as described above, the first contact portion 34A is brought into contact with the lower edge surface 16D and the right edge surface 16F, and the second contact portion 34B is brought into contact with the principal surface 16B. Thereafter, the screw is screwed into the fourth end surface 18D through the joint portion 34C. As a result, the fastening part 34 is joined to the fourth end surface 18D of the spacer 18 via the screw 36. Therefore, the lower right corner of the antenna unit 16 is joined to the spacer 18 via the fastening part 34 without any shift in position. Also, the three other fastening parts 34, 34, 34 arranged on the upper left corner, the upper right corner, and the lower left corner, respectively, of the antenna unit 16 are also joined to the spacers 18, 18 according to a similar procedure. Accordingly, the four corners of the antenna unit 16 are joined to the spacers 18, 18 without any shift in position. Note that the fastening part 34 according to the embodiment may be made of either resin or metal. The shape of the fastening part 34 explained above is merely an example, and the fastening part 34 is not limited to the shape explained above. The bonding by the fastener part 34 may be made by using a fitting technique or a sliding technique.

In addition, as illustrated in FIG. 3, a long link member 38 is provided along the upper edge portion of the antenna unit 16. This link member 38 is in contact with the upper edge surface 16C of the antenna unit 16. Similarly, a long link member 40 is provided along the lower edge portion of the antenna unit 16. This link member 40 is in contact with the lower edge surface 16D of the antenna unit 16.

As illustrated in FIG. 7 and FIG. 9, the L-shaped right edge portion 40A of the link member 40 is interposed between the joint portion 34C of the fastening part 34 at the lower right corner and the fourth end surface 18D of the spacer 18 at the right side, and the L-shaped right edge portion 40A of the link member 40 and the joint portion 34C are screwed to the fourth end surface 18D via the screw 36. Although not illustrated in the drawings, an L-shaped left edge portion of the link member 40 is interposed between the joint portion 34C of the fastening part 34 at the lower left corner and the fourth end surface 18D of the spacer 18 at the left side, and the L-shaped left edge portion of the link member 40 and the joint portion 34C are screwed to the fourth end surface 18D via the screw 36. As a result, the pair of fastening parts 34, 34 at the both of the left and right lower corners of the antenna unit 16 are linked by the link member 40. Note that the link member 38 is configured similarly to the link member 40. According to linking similar to the link member 40, the link members 38 and the joint portions 34C are joined to the third end surfaces 18C, 18C of the left and right spacers 18, 18 via the screws 36. Therefore, the pair of fastening parts 34, 34 arranged at both of the left and right upper corners of the antenna unit 16 are linked by the link member 38. The link members 38, 40 are examples of a first link member and a second link member that are constituent elements of the present invention. The link members 38, 40 may be made of either resin or metal.

Figure 11:
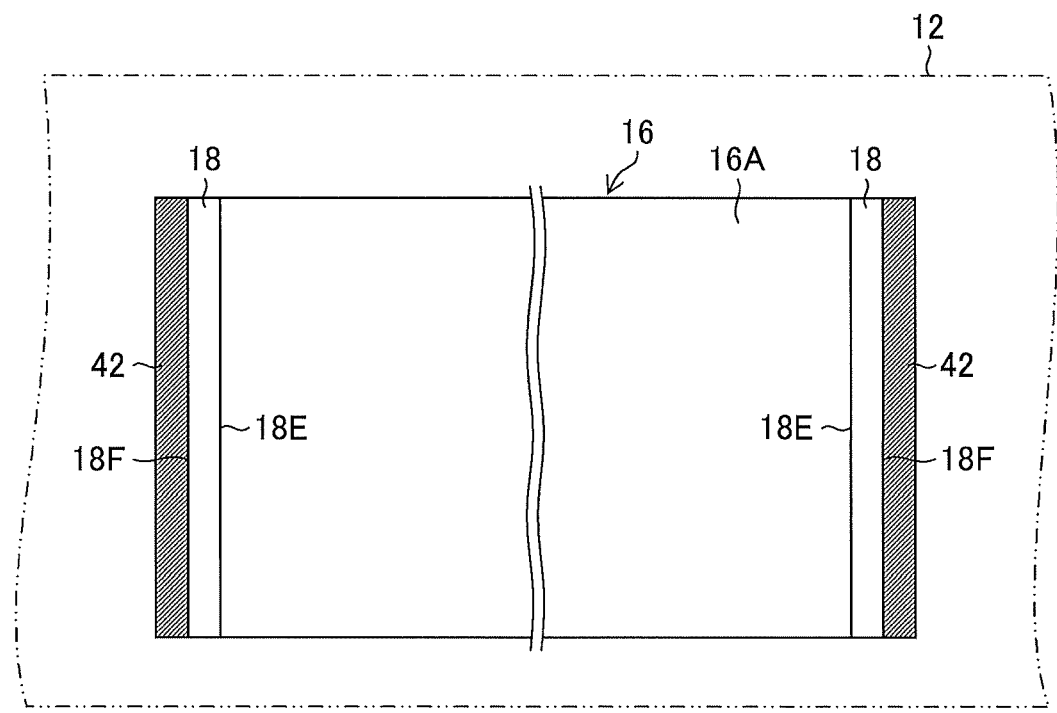
FIG. 11 is a plan view schematically illustrating an antenna unit having silicone sealant.
Figure 11:
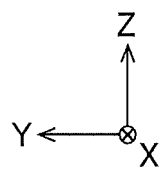
Figure 12:
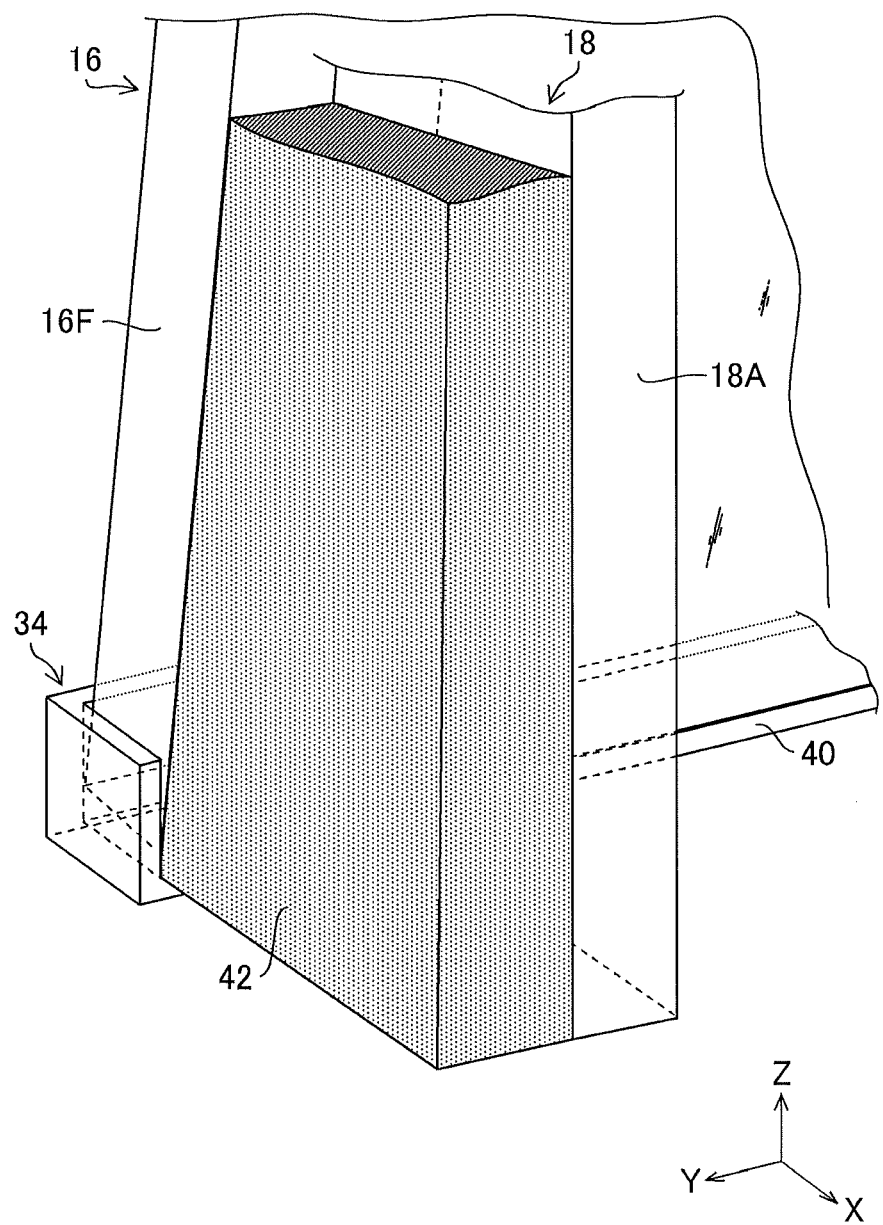
FIG. 12 is a perspective view of the silicone sealant as illustrated in FIG. 11.

As illustrated in a schematic plan view of the antenna unit 16 as seen from the outdoor side in FIG. 11, the functional member-attached glass window 10 preferably includes a silicone sealant 42 for reinforcing adhesion of the antenna unit 16 and the spacers 18, 18 to the glass plate 12. This silicone sealant 42 is provided to seal a gap 44 (see FIG. 8) enclosed by: outer surfaces 18F, 18F of the spacers 18, 18 on the side opposite from opposing surfaces 18E, 18E of the spacers 18, 18 facing each other in the Y direction; the glass plate 12; and the principal surface 16A of the antenna unit 16. FIG. 12 is a perspective view of the silicone sealant 42 provided in the gap 44. The silicone sealant 42 reinforces the adhesion of the antenna unit 16 and the spacers 18, 18 to the glass plate 12.

The silicone sealant 42 may be a structural sealing compound such as a two-component black sealant and a one-component black or white sealant, may be a milky white sealing compound in paste form, or may be a transparent (highly clear type) sealing compound. Among them, the structural sealing compound is suitable as the silicone sealant 42 because the structural sealing compound has higher adhesive strength, durability, and weather resistance than other sealing compounds. In contrast, the milky white sealing compound in paste form and the transparent sealing compound look more transparent than at least the structural sealing compound, and therefore, the milky white sealing compound in paste form and the transparent sealing compound are advantageous in that the design of the functional member-attached glass window 10 can be improved. For example, the two-component black structural sealing compound is DC121 produced by Dow Corning Corporation. An example of the one-component black or white structural sealing compound includes alcohol type silicone sealant (SE960 produced by Dow Corning Toray Co. Ltd.). Examples of the milky white sealing compound in paste form include SE9185 produced by Dow Corning Toray Co. Ltd. and KE-4898 produced by Shin-Etsu Chemical Co., Ltd. Examples of the transparent sealing compound include one-component oxime type silicone sealant (KE-450 produced by Shin-Etsu Chemical Co., Ltd.) and heat curing type silicone (DOWSIL (registered trademark) TSSA produced by Dow Corning Corporation).

According to the functional member-attached glass window 10 of the first embodiment configured as described above, the antenna unit 16 is pasted to the glass plate 12 with via spacers 18, 18 and joined to the spacers 18, 18 via the fastening parts 34, and therefore, the antenna unit 16 having a surface area smaller than that of the glass plate 12 of the glass window 14 can be stably arranged at the high position on the glass plate 12. Even in a case where a large amount of stress is generated in the spacers 18, 18 due to an earthquake, causing the antenna unit 16 to peel off from the spacers 18, 18, the antenna unit 16 can be prevented from falling from the spacers 18, 18 because the antenna unit 16 is joined to the spacers 18, 18 via the fastening parts 34. With the above configuration, according to the functional member-attached glass window 10 of the embodiment, the antenna unit 16 can be stably arranged at the high position on the glass plate 12.

According to the functional member-attached glass window 10 of the first embodiment, the fastening parts 34 are joined to the spacers 18 via the screws 36, so that the fastening parts 34 and the spacers 18, 18 can be fixed rigidly. Therefore, the antenna unit 16 can be reliably prevented from falling from the spacers 18, 18.

According to the functional member-attached glass window 10 of the first embodiment, the fastening part 34 includes: the first contact portion 34A that comes into contact with two end surfaces of the antenna unit 16 in directions perpendicular to each other; and the second contact portion 34B that comes into contact with the principal surface 16B of the antenna unit 16 and configured such that the antenna unit 16 is sandwiched between the second contact portion 34B and the spacer 18, and therefore, the antenna unit 16 can be joined to the spacers 18, 18 without the antenna unit 16 being relatively shifted in position, i.e., without rattling.

According to the functional member-attached glass window 10 of the first embodiment, the pair of fastening parts 34, 34 arranged at both of the left and right upper corners of the antenna unit 16 are linked by the link member 38, and therefore, the joining force between the upper part of the antenna unit 16 and the spacers 18, 18 can be increased. In addition, the pair of fastening parts 34, 34 arranged at both of the left and right lower corners of the antenna unit 16 are linked by the link member 40, and therefore, the joining force between the lower part of the antenna unit 16 and the spacers 18, 18 can be increased. As a result, the antenna unit 16 can be stably joined to the spacer 18.

According to the functional member-attached glass window 10 of the first embodiment, the fastening parts 34 are explained as being arranged at four corners of the antenna unit 16. However, it is sufficient as long as at least two or more corners of the four corners may be provided with fastening parts 34.

Second Embodiment

Figure 13:
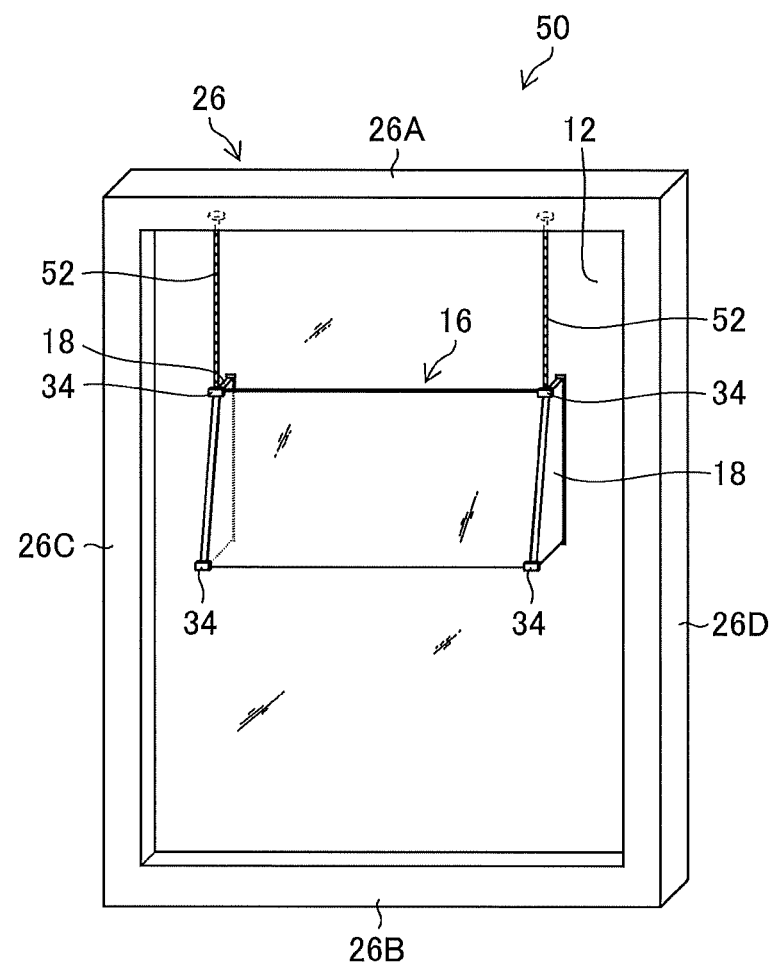
FIG. 13 is a drawing for explaining a functional member-attached glass window according to a second embodiment.
Figure 13:
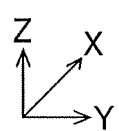

FIG. 13 is an explanatory diagram illustrating a functional member-attached glass window 50 according to the second embodiment.

The functional member-attached glass window 50 illustrated in FIG. 13 is different from the functional member-attached glass window 10 illustrated in FIG. 1 in that the functional member-attached glass window 50 is provided with wires 52. Since the configuration other than the wires 52 is the same, only the difference is hereinafter explained. One end of the wire 52 is fixed to the fastening part 34, and the other end of the wire 52 is fixed to the existing sash 26 (or to the building 20 illustrated in FIG. 1) to which the glass window 14 is attached.

All of the fastening parts 34 arranged at the four corners of the antenna unit 16 may be fixed to ends of the wires 52, but as illustrated in FIG. 13, the two fastening parts 34, 34 arranged at both of the left and right upper corners are preferably fixed to ends of the wires 52, 52. Alternatively, at least one fastening part 34 of these two fastening parts 34, 34 may be fixed to an end of the wire 52. As an example of fixing an end of the wire 52 to the fastening part 34, the end of the wire 52 may be fixed to the screw 36, thereby fixing the wire 52 to the fastening part 34 via the screw 36.

As an example of fixing the other end of the wire 52, the other end of the wire 52 may be fixed to a screw (not illustrated), and this screw may be fixed to the sash 26 (or to the building 20).

According to the functional member-attached glass window 50 having the wires 52 as described above, even if the spacers 18, 18 peeled off from the glass plate 12, the antenna unit 16 attached with via spacers 18 will hang from the sash 26 (or from the building 20) via the wires 52. Therefore, the antenna unit 16 attached with via spacers 18 can be prevented from falling. It should be noted that the wire 52 is an example of a linear member that is a constituent element of the present invention.

Third Embodiment

Figure 14:
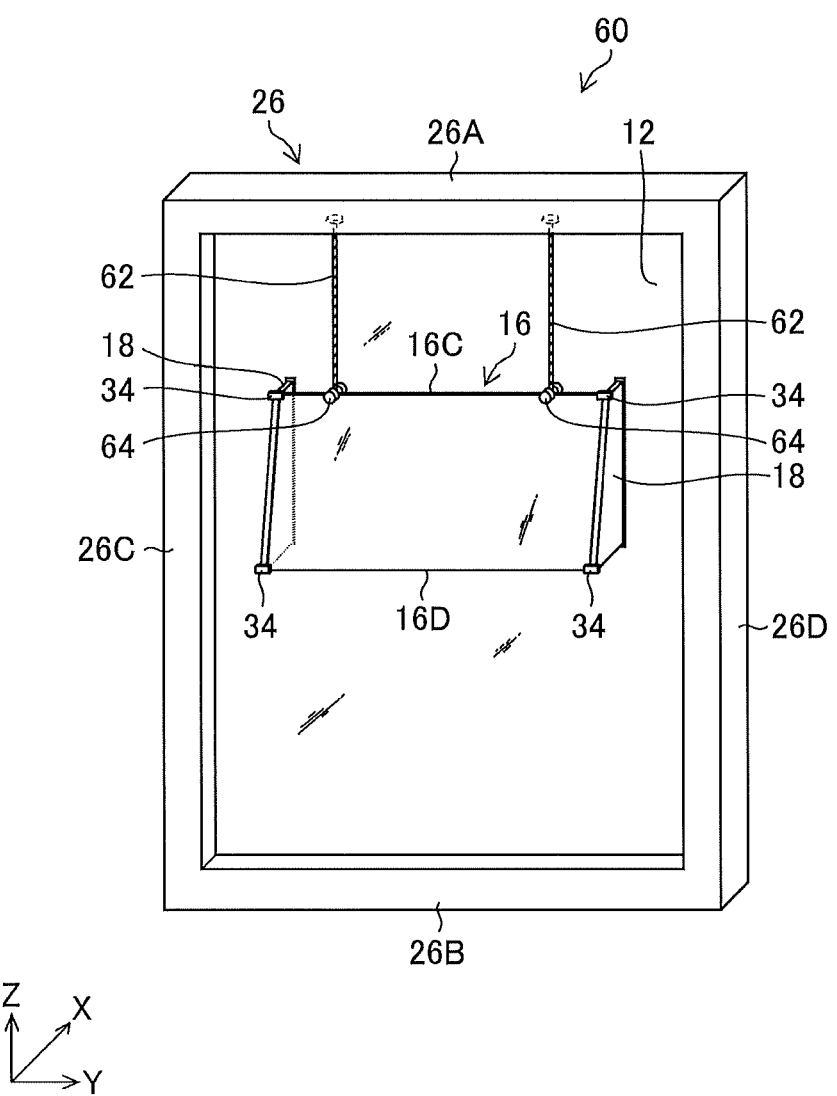
FIG. 14 is a drawing for explaining a functional member-attached glass window according to a third embodiment.

FIG. 14 is an explanatory diagram of a functional member-attached glass window 60 according to the third embodiment.

The functional member-attached glass window 60 as illustrated in FIG. 14 is different from the functional member-attached glass window 10 as illustrated in FIG. 1 in that the functional member-attached glass window 60 is provided with wires 62, 62. Since the configuration other than the wires 62 is the same, only the difference is hereinafter explained. The lower ends of the wires 62 are fixed to the upper edge surface 16C of the antenna unit 16 with hanging brackets 64, and the upper ends of the wires 62 are fixed to the upper horizontal frame 26A of the sash 26. The upper ends of the wires 62 may be connected to the building 20 illustrated in FIG. 1.

Specifically, for example, a hanging bracket (wire system BSU-1S produced by Arakawa & Co., Ltd.) may be employed as the hanging bracket 64, and with the hanging bracket 64 being fixed to the upper edge surface 16C of the antenna unit 16, the lower end of the wire 62 is fixed to antenna unit 16. In the configuration illustrated in the example, the hanging bracket 64 has a pair of metal fittings that sandwich the antenna unit 16 in the thickness direction. Instead of this configuration, a through hole may be formed in the antenna unit 16 and a screw may be inserted through the through hole. Then, a bifurcated metal fitting may be fixed to both ends of the screw, and the lower end of the wire 62 may be fixed to this metal fitting. Such a metal fitting may be, for example, a metal fitting (wire system S-01 produced by Arakawa & Co., Ltd.).

According to the functional member-attached glass window 60 configured as described above, the antenna unit 16 is fixed to the upper horizontal frame 26A of the sash 26 (or to the building 20 of FIG. 1) via the wires 62. Therefore, even if the spacers 18, 18 peeled from the glass plate 12, the antenna unit 16 attached with via spacers 18 will hang from the upper horizontal frame 26A of the sash 26 (or from the building 20) via the wires 62. As a result, the antenna unit 16 attached with via spacers 18 can be prevented from falling.

When the wires 62 are employed, a part of the function for preventing falling of the antenna unit 16 attached with via spacers 18 can be achieved by the wires 62. Therefore, for example, instead of the structural sealing compound having a high adhesive strength, a milky white sealing compound in paste form or a transparent sealing compound can be employed as the silicone sealant 42 (see FIG. 12) having the fall prevention function. The use of the milky white or transparent sealing compound makes the sealing compound less noticeable, and therefore, the design of the functional member-attached glass window 60 can be enhanced. In a case where the milky white or transparent sealing compound is used, it is preferable to use, instead of the butyl tapes 30, 32, a transparent adhesive agent, for example, acrylic foam base strong adhesive double sided tapes (e.g., 3M VHB Tape (registered trademark) produced by Sumitomo 3M Limited). When the transparent adhesive agent is used, the design of the functional member-attached glass window 60 can be further enhanced.

Although the functional member-attached glass window 60 according to the third embodiment uses two wires 62, 62 to fix the antenna unit 16 to the side of the sash 26, it is sufficient as long as only one wire 62 is used, or alternatively, three or more wires 62 may be used. In addition, a similar hanging bracket 64 or a metal fitting as explained above may be provided on the lower edge surface 16D of the antenna unit 16, and the lower edge surface 16D of the antenna unit 16 may be fixed to the lower horizontal frame 26B of the sash 26 with other wires.

Still alternatively, a single wire 62 or two wires 62 may be provided from the upper horizontal frame 26A to the lower horizontal frame 26B of the sash 26, and the upper edge surface 16C and the lower edge surface 16D of the antenna unit 16 may be fixed via the hanging brackets 64 attached to the wires. In this configuration, the wires 62 are arranged along the Z direction, and accordingly, the spacers 18 are preferably configured to be in a rectangular shape in a side view, and the principal surfaces 16A, 16B of the antenna unit 16 are preferably arranged in parallel with the glass plate 12.

Next, examples of methods and jig for fixing the upper end of the wire 62 are explained.

Figure 15:
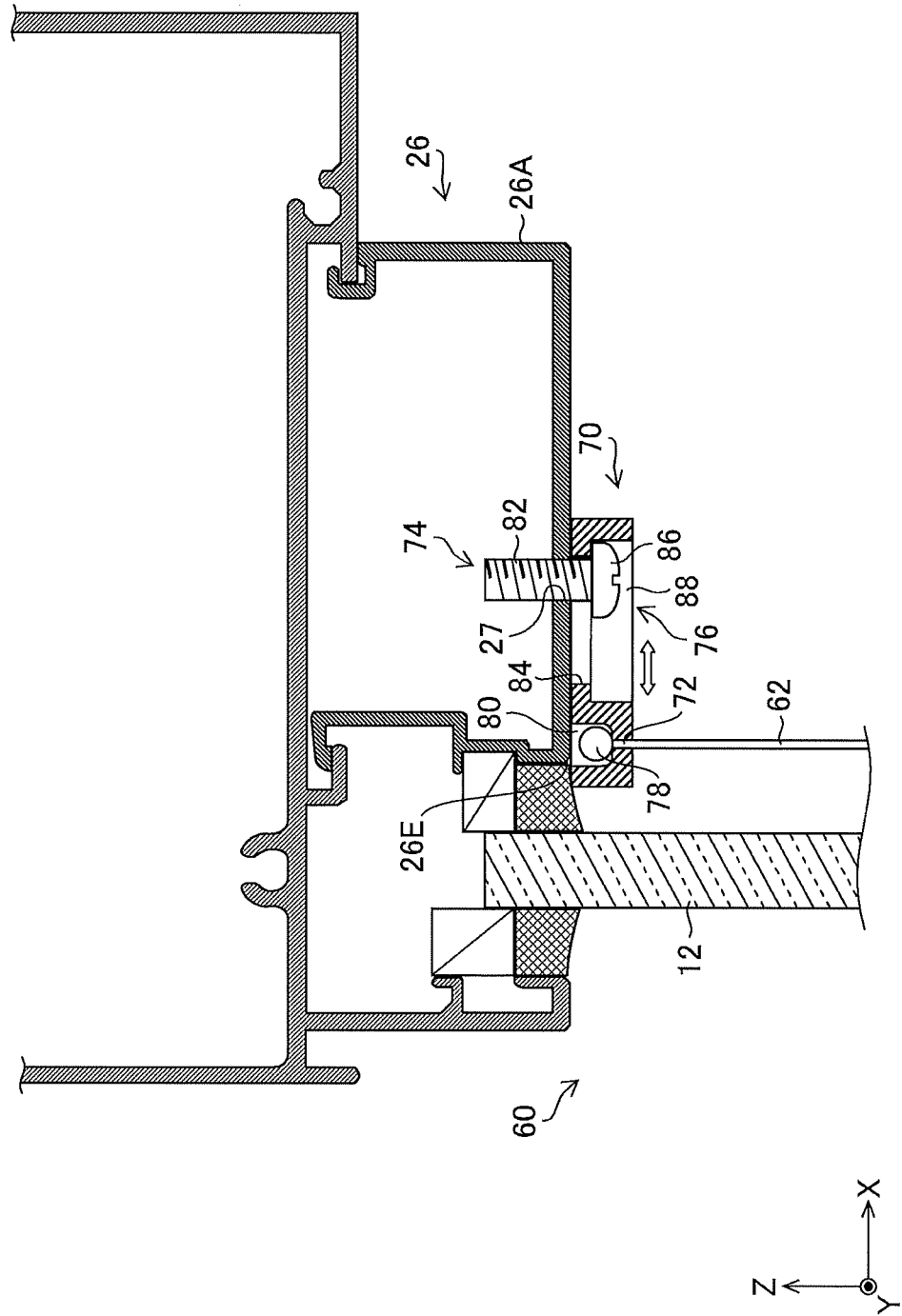
FIG. 15 is a cross sectional view illustrating a main part of a fixing portion in which an upper end of a wire is fixed to a sash via a first fixing jig.
Figure 16:
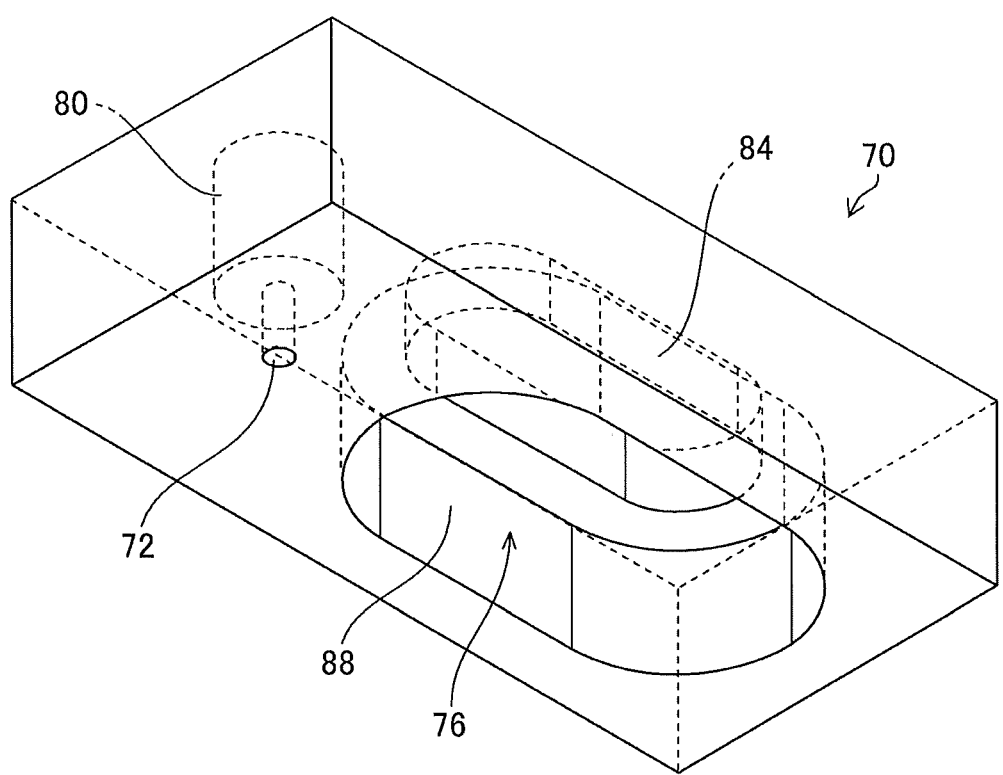
FIG. 16 is a perspective view of the structure of the first fixing jig illustrated in FIG. 1.

FIG. 15 is a cross sectional view illustrating a main part in which the upper end of the wire 62 is fixed to the upper horizontal frame 26A of the sash 26 with a first fixing jig 70. FIG. 16 is a perspective view of the structure of the fixing jig 70.

As illustrated in FIG. 16, as a whole, the fixing jig 70 is configured in a rectangular parallelepiped shape, and in the vertical direction, the fixing jig 70 includes: a wire through hole 72 through which the wire 62 is arranged; and a slit 76 through which a screw 74 (see FIG. 15) is arranged.

Through the wire through hole 72, for example, a wire 62 having a ball 78 (see FIG. 15) fixed to the upper end (for example, a ball-stopped wire produced by Arakawa & Co., Ltd.) is inserted from above the wire through hole 72. The wire through hole 72 has a diameter larger than the wire 62 but smaller than the ball 78. In addition, a through hole 80 for ball engagement, with a larger diameter than the ball 78, is provided above the wire through hole 72 coaxially via the wire through hole 72. Therefore, when the wire 62 is inserted from the upper side of the wire through hole 72 and the ball 78 comes into contact with the bottom of the through hole 80, the upper end of the wire 62 attaches to the fixing jig 70.

The slit 76 of the fixing jig 70 is provided along a thickness direction (the X direction) of the glass plate 12 in FIG. 15. In this slit 76, the screw 74 is inserted from the lower side of the slit 76. The slit 76 includes: a guide groove 84 penetrating in the vertical direction and configured to accommodate a thread portion 82 (see FIG. 15); and a guide groove 88 for a screw head 86 (see FIG. 15). The guide groove 88 is configured to have such a size that the screw head 86 can be passed through the guide groove 88. The guide groove 84 is configured to have such a size that the thread portion 82 can be passed through the guide groove 84 but the screw head 86 cannot be passed through the guide groove 84.

According to the fixing jig 70 configured as described above, the ball 78 at the upper end of the wire 62 is attached to the through hole 80 of the fixing jig 70, and thereafter, the screw 74 (see FIG. 15) is inserted into the slit 76 to screw the thread portion 82 with a screw hole 27 (see FIG. 15) of the upper horizontal frame 26A. Therefore, the upper end of the wire 62 can be fixed to the upper horizontal frame 26A with the fixing jig 70. Even if it is difficult to arrange the wire 62 along the Z direction, the wire 62 can be arranged along the Z direction by using the fixing jig 70.

Specifically, when the wire 62 is attempted to be arranged along the Z direction in the upper horizontal frame 26A illustrated in FIG. 15, a fixing part (for example, a screw hole) for fixing the upper end of the wire 62 is to be formed at an edge portion 26E of the upper horizontal frame 26A, but it is difficult to form such an edge portion 26E. In this case, if the fixing jig 70 is used, the actual fixing position of the upper end of the wire 62 with the upper horizontal frame 26A is the position of the screw hole 27 that is away from the edge portion 26E in the X direction, and therefore, the wire 62 can be arranged along the Z direction. In addition, by loosening the screw 74, the fixing jig 70 can be moved in the X direction using the slit 76 as a guide, so that the wire 62 can be finely adjusted to extend along the Z direction. Also, the inclination angle of the wire 62 with respect to the Z direction can be adjusted.

Figure 17:
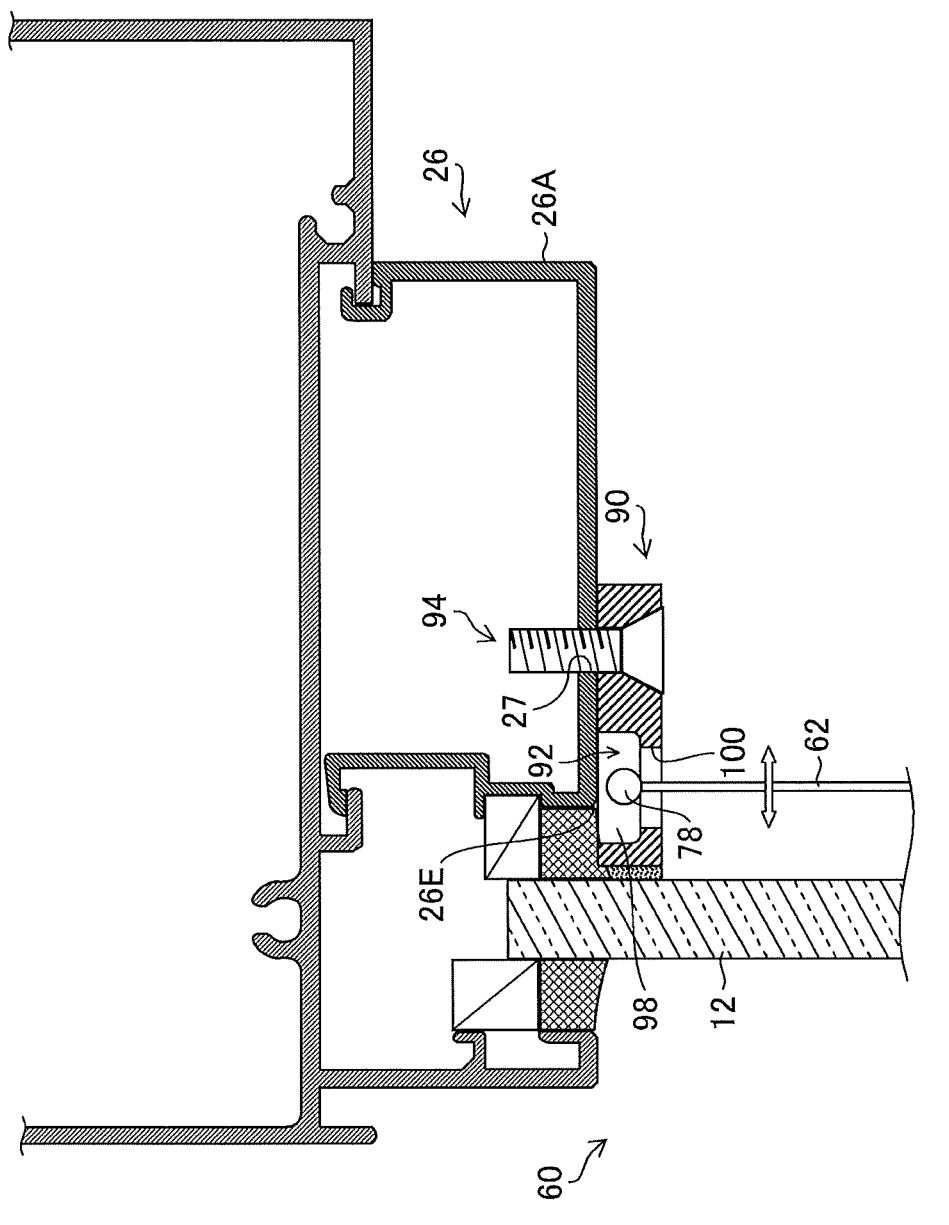
FIG. 17 is a cross sectional view illustrating a main part of a fixing portion in which an upper end of a wire is fixed to a sash with a second fixing jig.
Figure 18:
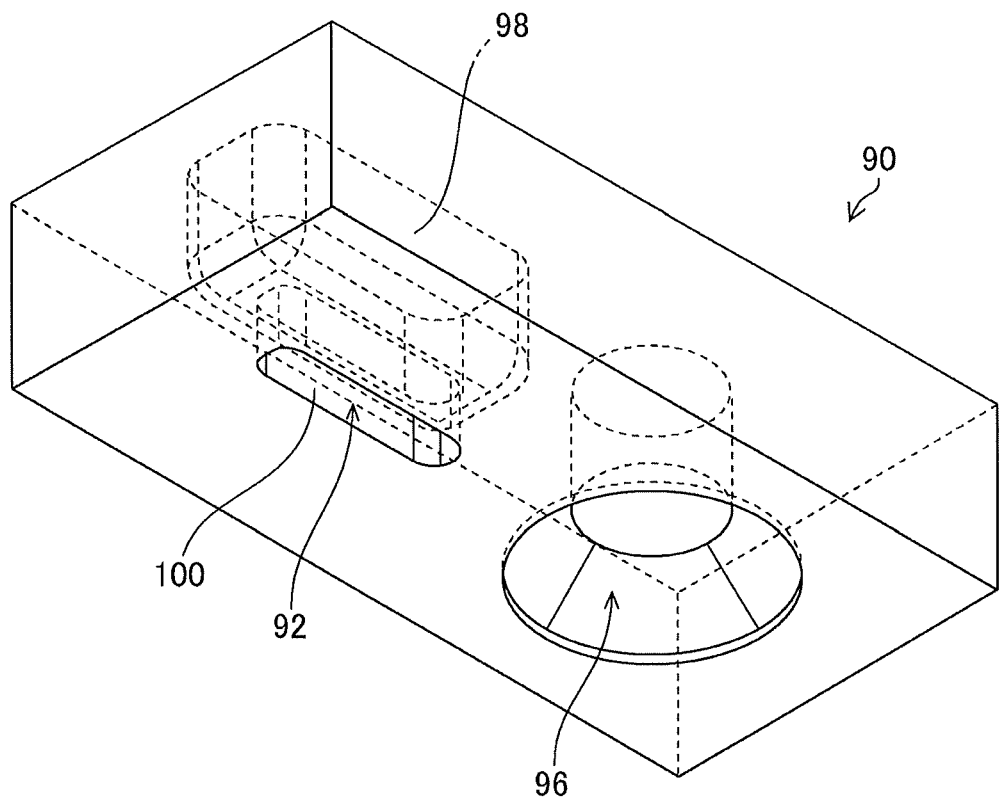
FIG. 18 is a perspective view of the second fixing jig illustrated in FIG. 17.

FIG. 17 is a cross sectional view illustrating a main part in which the upper end of the wire 62 is fixed to the upper horizontal frame 26A of the sash 26 by using a second fixing jig 90. FIG. 18 is a perspective view of a structure of the fixing jig 90.

As illustrated in FIG. 18, as a whole, the fixing jig 90 is configured in a rectangular parallelepiped shape, and in the vertical direction, the fixing jig 90 includes: a slit 92 through which the wire 62 is arranged; and a screw through hole 96 through which a flat head screw 94 (see FIG. 17) is arranged.

The slit 92 is provided along a thickness direction (the X direction) of the glass plate 12 in FIG. 17. Through the slit 92, the wire 62 with the ball 78 fixed to the upper end is inserted from the upper side of the slit 92. The slit 92 includes: a guide groove 98 penetrating in the vertical direction and configured to accommodate a ball 78 (see FIG. 17); and a guide groove 100 for the wire 62. The guide groove 98 is configured to have such a size that the ball 78 can be passed through the guide groove 98. The guide groove 100 is configured to have such a size that the wire 62 can be passed through the guide groove 100 but the ball 78 cannot be passed through the guide groove 100. Therefore, when the wire 62 is inserted from the upper side of the slit 92 and when the ball 78 comes into contact with the bottom of the guide groove 98, the upper end of the wire 62 attached to the fixing jig 90.

In contrast, through the screw through hole 96, the flat head screw 94 (see FIG. 17) is inserted from the lower side of the screw through hole 96. The flat head screw 94 is screwed in the screw hole 27 (see FIG. 17) of the upper horizontal frame 26A.

According to the fixing jig 90 configured as described above, after the ball 78 of the upper end of the wire 62 is attached to the guide groove 98 of the fixing jig 90, the flat head screw 94 is inserted into the screw through hole 96 so that the flat head screw 94 is screwed into the screw hole 27 of the upper horizontal frame 26A. Therefore, the upper end of the wire 62 can be fixed to the upper horizontal frame 26A with the fixing jig 90. Even if it is difficult to arrange the wire 62 along the Z direction, the wire 62 can be arranged along the Z direction by using the fixing jig 90.

Specifically, when the wire 62 is attempted to be arranged along the Z direction in the upper horizontal frame 26A illustrated in FIG. 17, a fixing part (for example, a screw hole) for fixing the upper end of the wire 62 is to be formed at an edge portion 26E of the upper horizontal frame 26A, but it is difficult to form such an edge portion 26E. In this case, if the fixing jig 90 is used, the actual fixing position of the upper end of the wire 62 with the upper horizontal frame 26A is the position of the screw through hole 96 that is away from the edge portion 26E in the X direction, and therefore, the wire 62 can be arranged along the Z direction. In addition, the ball 78 can be moved in the X direction along the guide groove 98, so that the wire 62 can be finely adjusted to extend along the Z direction. Also, in a manner similar to the fixing jig 70, the inclination angle of the wire 62 with respect to the Z direction can be adjusted.

Fourth Embodiment

Figure 19:
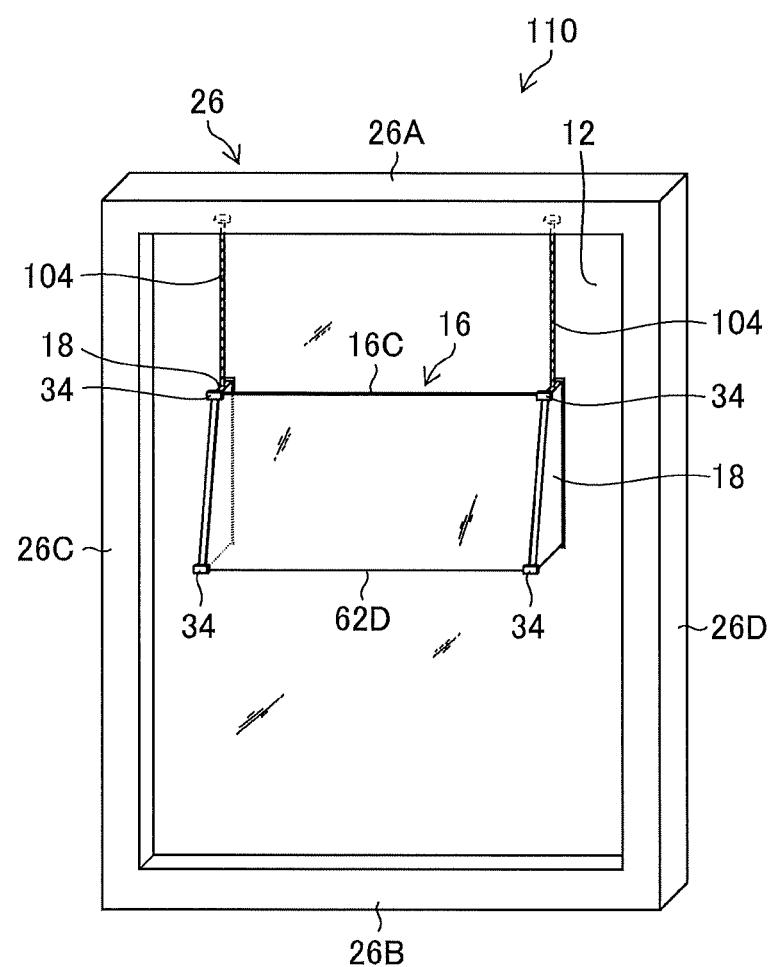
FIG. 19 is a drawing for explaining a functional member-attached glass window according to a fourth embodiment.

FIG. 19 is an explanatory diagram of a functional member-attached glass window 110 according to the fourth embodiment.

The functional member-attached glass window 110 illustrated in FIG. 19 is different from the functional member-attached glass window 60 illustrated in FIG. 14 in that the lower ends of the wires 62, 62 are fixed to the spacers 18, 18.

Figure 20:
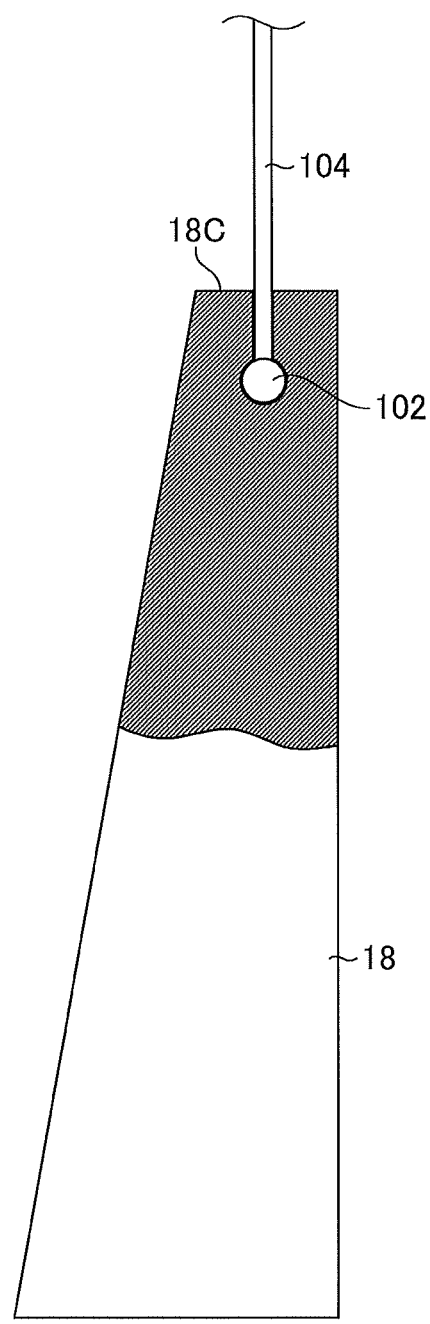
FIG. 20 is a side view of a spacer partially including a cross section.

Specifically, as illustrated in a side view partially including a cross section of the spacer 18 illustrated in FIG. 20, a wire 104 having a ball 102 fixed to the lower end (for example, a ball-stopped wire produced by Arakawa & Co., Ltd.) is inserted through the third end surface 18C of the spacer 18 to be embedded in the spacer 18, so that the lower end of the wire 104 is fixed to the spacer 18.

According to the functional member-attached glass window 110 configured as described above, the spacers 18, 18 are fixed to the sash 26 (or to the building 20 of FIG. 1) via the wires 104, 104, and therefore, even if the spacers 18, 18 peeled off from the glass plate 12, the antenna unit 16 attached with via spacers 18 will hang from the sash 26 (or from the building 20) via the wires 104, 104. As a result, the antenna unit 16 attached with via spacers 18 can be prevented from falling.

Figure 21:
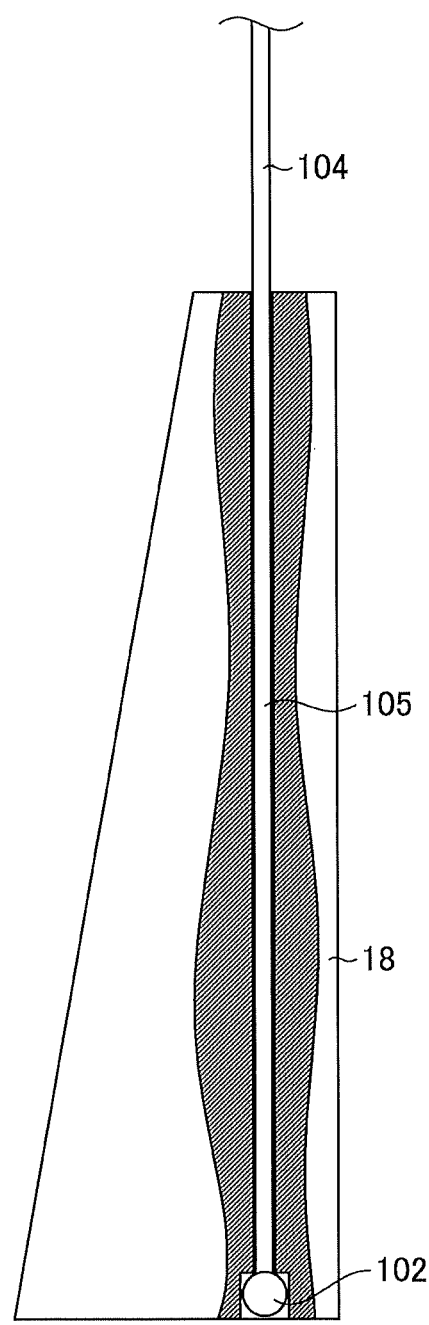
FIG. 21 is a side view of a spacer partially including a cross section.

In the fourth embodiment, the wire 104 having the ball 102 fixed to the lower end is used, but instead of the wire 104, a wire having a threaded portion fixed to the lower end may be used such that the thread portion is inserted through the third end surface 18C of the spacer 18 to be screwed in the spacer 18, so that the lower end of the wire is fixed to the spacer 18. Also, a wire through hole may be formed in the fastening part 34 (see FIG. 13), and the lower end of the wire may be passed through the wire through hole and fixed to the spacer 18. Further, as illustrated in a side view partially including a cross section of the spacer 18 illustrated in FIG. 21, the lower portion 105 of the wire 104 may be inserted from the third end surface 18C to the fourth end surface 18D of the spacer 18 to be embedded in the spacer 18.

Hereinafter, a preferred arrangement of the wire and the glass plate is explained.

As a first example, for example, as illustrated in a side view of a functional member-attached glass window 60 in FIGS. 15, 17, the wire 62 and the glass plate 12 are preferably arranged along the Z direction (vertical direction). When the wire 62 and the glass plate 12 are arranged in such a direction, the holding power of the wire 62 for holding the antenna unit 16 attached with via spacers 18 can be increased. As a result, the antenna unit 16 attached with via spacers 18 can be effectively prevented from falling.

Figure 22:
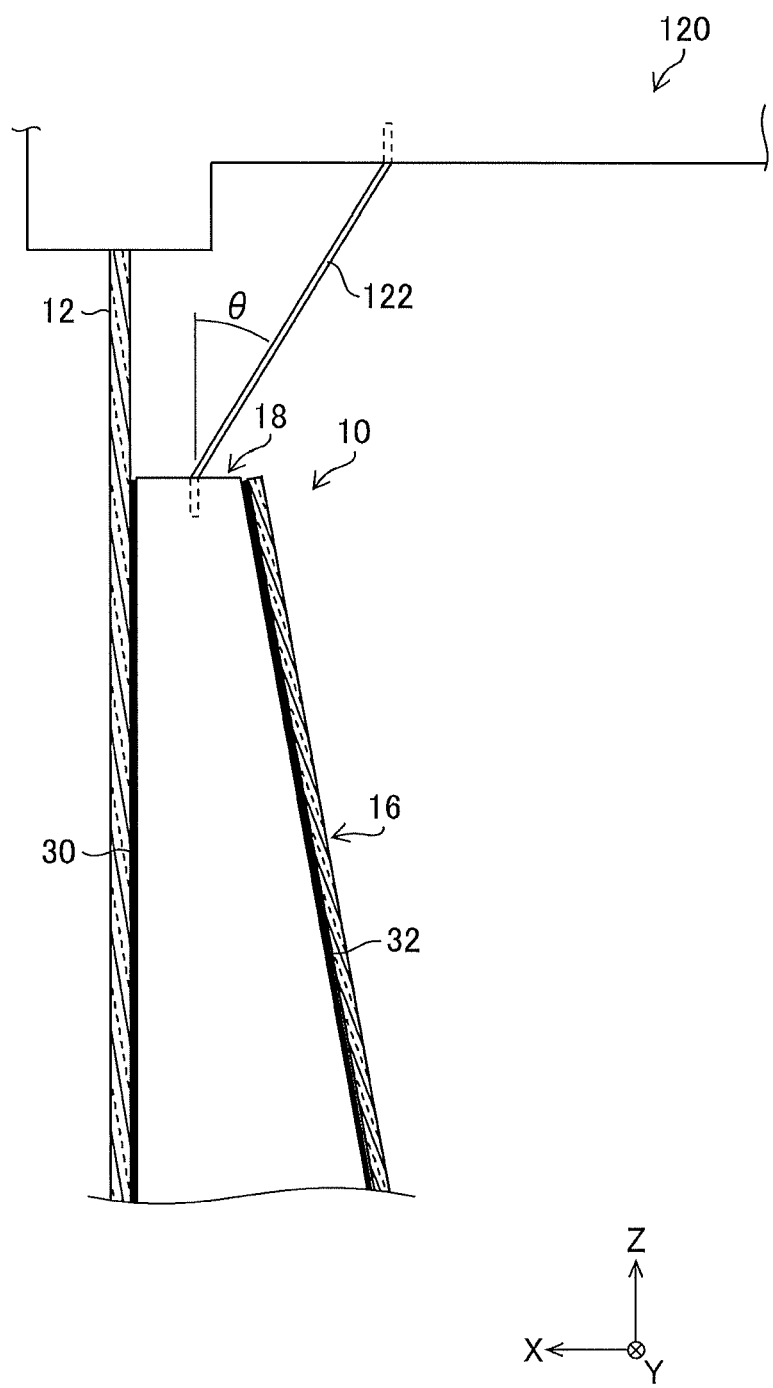
FIG. 22 is a side view of a main part of a wire connection portion of a functional member-attached glass window, indicating an inclination angle of a wire.

As a second example, for example, as illustrated in a side view of a functional member-attached glass window 120 in FIG. 22, the glass plate 12 is preferably arranged along the Z direction (vertical direction), and an angle θ formed by the Z axis (vertical axis) and the wire 122 preferably is more than 0 degrees and less than 90 degrees. When the wire 122 and the glass plate 12 are arranged in such a direction, the antenna unit 16 attached with via spacers 18 can be held by the wires 122 from the ceiling of the building 20 at a position shifted in the X direction (horizontal direction) from immediately above the antenna unit 16. Electric wiring (not illustrated) is connected to the antenna 28 as illustrated in FIG. 4, and the electric wiring is routed from the antenna unit 16 to the outside of the antenna unit 16, and passed through the opening in the ceiling into the space behind the ceiling. In this case, the arrangement angle of the wire 122 can be adjusted to the arrangement angle of the electric wiring (i.e., more than 0 degrees and less than 90 degrees with respect to the Z axis), and therefore, in a case where the functional member-attached glass window 120 is seen from the Y direction, the electric wiring and the wire 122 overlap and do not look cluttered. As a result, the design of the functional member-attached glass window 120 can be improved.

In the first to fourth embodiments explained above, the antenna unit 16 made of glass has been explained, but the material constituting the antenna unit 16 is selected according to the antenna performance such as the power or directivity required for the antenna 28, and thus, the antenna unit 16 may be made of resin or metal, for example. If the antenna unit 16 has a light-transmitting property as in glass or resin, the glass plate 12 can be seen from the indoor side through the antenna unit 16, so that the scenery seen through the glass plate 12 is less obstructed by the antenna unit 16. The thickness of the antenna unit 16 is set to any given thickness according to the location where the antenna 28 is arranged. The antenna unit 16 is preferably provided with a wave directing member. The wave directing member is provided to be located between the glass plate 12 and the antenna 28, and has a function of directing the electromagnetic waves radiated from the antenna 28 in a particular direction.

Also, the glass plate 12 is not limited to a single glass plate. The glass plate 12 may be constituted by laminated glass in which two or more glass plates are bonded with an interlayer film, or the glass plate 12 may be constituted by insulated glazing.

Figure 23:
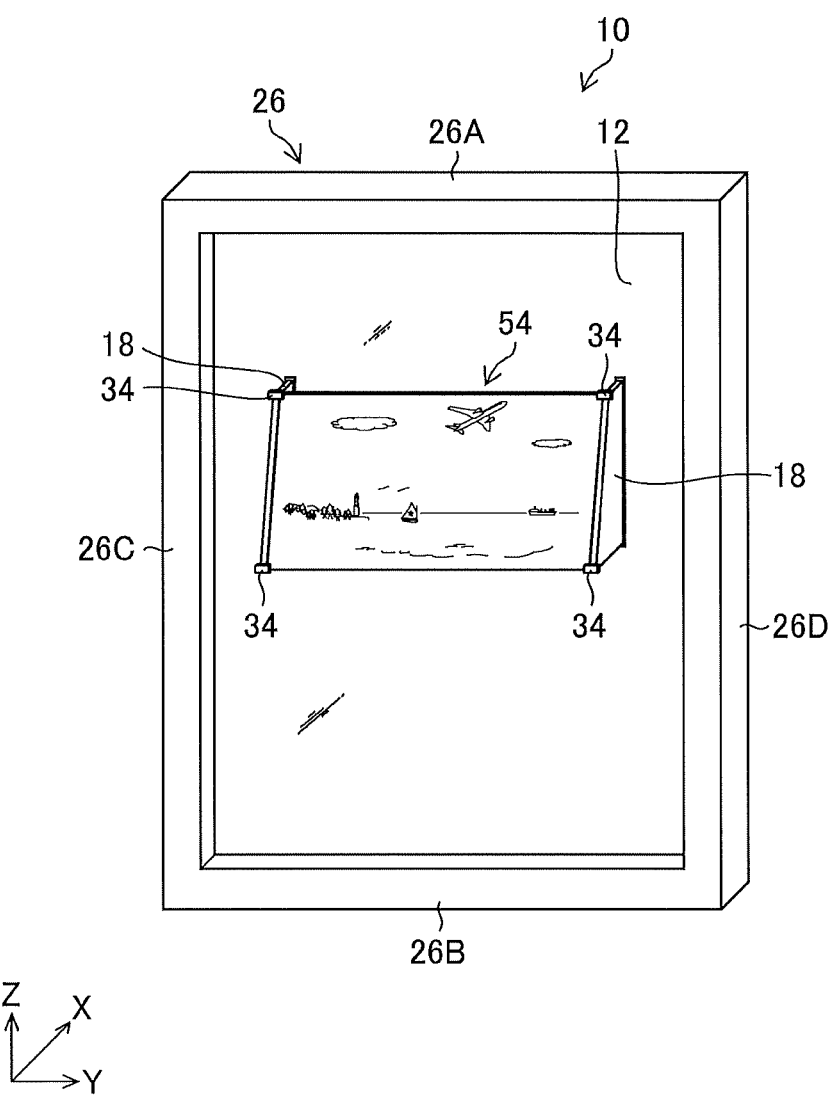
FIG. 23 is a drawing for explaining a functional member-attached glass window in a case where a functional member is a display apparatus.

In the first to fourth embodiments, for example, the antenna unit 16 has been explained as a functional member. Instead of the antenna unit 16, a display 54 may be employed as described in another embodiment illustrated in FIG. 23.

Also, instead of the fastening part 34 according to the embodiments, for example, a functional member may be joined to the spacer via a fastening part such as a screw. As an example of bonding with a screw, for example, a through hole may be formed in a functional member, and a screw is screwed into the spacer through the through hole to bond the functional member to the spacer via the screw.

What is claimed is:

1. A functional member-attached glass window, comprising:
    a glass window comprising a glass plate and configured to be erected on a floor surface of a building;
    a functional member having a surface area smaller than a surface area of the glass plate in the glass window;
    a spacer positioned between the functional member and the glass plate of the glass window such that a space is formed between the functional member and the glass plate; and
    a fastening part fastening the functional member to the spacer and joining the functional member to the spacer,
    wherein the functional member is pasted to the glass plate of the glass window via the spacer such that the functional member is positioned apart from and higher than the floor surface of the building,
    wherein the spacer includes a first end surface pasted to the glass plate with a first adhesive agent, and a second end surface pasted to a vertical edge portion of the functional member with a second adhesive agent.

2. The functional member-attached glass window according to claim claim 1, wherein the fastening part is joined to the spacer with a fastener.

3. The functional member-attached glass window according to claim 1, further comprising:
    a linear member,
    wherein one end of the linear member is fixed to the fastening part, and another end of the linear member is fixed to a sash or the building to which the glass window is to be attached.

4. The functional member-attached glass window according to claim 1, wherein the functional member is an antenna unit or a display apparatus.

5. The functional member-attached glass window according to claim 1, wherein the spacer is configured to position the functional member such that a principal surface of the functional member is inclined with respect to the glass plate of the glass window.

6. The functional member-attached glass window according to claim 1, wherein the spacer is configured to position the functional member such that a principal surface of the functional member is parallel to the glass plate of the glass window.

7. The functional member-attached glass window according to claim 1, wherein the spacer comprises a plurality of spacers, the functional member is a plate having a rectangular shape in a plan view and including a principal surface and an end surface, left and right vertical edge portions, and upper and lower horizontal edge portions, and the left and right vertical edge portions, the upper and lower horizontal edge portions or both of the left and right vertical edge portions and the upper and lower horizontal edge portions are pasted to the glass plate with the plurality of spacers.

8. The functional member-attached glass window according to claim 3, wherein the fastening part is positioned on each of four corners of the functional member.

9. The functional member-attached glass window according to claim 7, wherein the left and right vertical edge portions, the upper and lower horizontal edge portions or both of the left and right vertical edge portions and the upper and lower horizontal edge portions are pasted to the glass plate with an adhesive agent via the plurality of spacers.

10. The functional member-attached glass window according to claim 3, wherein the fastening part is positioned on each of at least two of four corners of the functional member.

11. The functional member-attached glass window according to claim 10, wherein the end surface includes a first end surface and a second end surface formed in directions perpendicular to each other, and the fastening part includes a first contact portion configured to contact with the first end surface and the second end surface at one of the four corners of the functional member, and a second contact portion configured to contact with the principal surface of the functional member such that the functional member is sandwiched between the second contact portion and a respective one of the spacers.

12. The functional member-attached glass window according to claim 10, further comprising:
a link member positioned along an upper edge portion of the functional member,
wherein the fastening part is positioned on each of an upper left corner and an upper right corner of the functional member, and the fastening part on the upper left corner of the functional member and the fastening part on the upper right corner of the functional member are linked by the link member.

13. The functional member-attached glass window according to claim 12, further comprising:
a second link member positioned along a lower edge portion of the functional member,
wherein the fastening part is positioned on each of a lower left corner and a lower right corner of the functional member, and the fastening part on the lower left corner of the functional member and the fastening part on the lower right corner of the functional member are linked by the second link member.

14. A functional member-attached glass window, comprising:
a glass window comprising a glass plate and configured to be erected on a floor surface of a building;
a functional member having a surface area smaller than a surface area of the glass plate;
a spacer positioned between the functional member and the glass plate of the glass window such that a space is formed between the functional member and the glass plate; and
a linear member having one end fixed to the functional member or the spacer, and another end fixed to a sash or the building to which the glass window is to be attached,
wherein the functional member is pasted to the glass plate of the glass window with the spacer such that the functional member is positioned apart from and higher than the floor surface of the building,
wherein the spacer includes a first end surface pasted to the glass plate with a first adhesive agent, and a second end surface pasted to a vertical edge portion of the functional member with a second adhesive agent.

15. The functional member-attached glass window according to claim 14, wherein the linear member is positioned along a vertical direction, and the glass plate is positioned such that a principal surface of the glass plate is parallel to the vertical direction.

16. The functional member-attached glass window according to claim 10, wherein the glass plate is positioned such that a principal surface of the glass plate is parallel to a vertical direction, and that an angle formed by a vertical axis and the linear member is more than 0 degrees and less than 90 degrees.

17. The functional member-attached glass window according to claim 14, wherein the spacer comprises a plurality of spacers, the functional member is a plate having a rectangular shape in a plan view and including a principal surface and an end surface, left and right vertical edge portions, and upper and lower horizontal edge portions, and the left and right vertical edge portions, the upper and lower horizontal edge portions or both of the left and right vertical edge portions and the upper and lower horizontal edge portions are pasted to the glass plate via the plurality of spacers.

18. The functional member-attached glass window according to claim 14, wherein the left and right vertical edge portions, the upper and lower horizontal edge portions or both of the left and right vertical edge portions and the upper and lower horizontal edge portions are pasted to the glass plate with an adhesive agent via the plurality of spacers.

19. The functional member-attached glass window according to claim 14, further comprising:
a fastening part fastening the functional member to the spacer such that the one end of the linear member is fixed to the spacer with the fastening part.

20. The functional member-attached glass window according to claim 19, further comprising:
a fastener fastening the fastening part to the spacer.

21. The functional member-attached glass window according to claim 19, wherein the fastening part is positioned on each of at least two of four corners of the functional member.

22. The functional member-attached glass window according to claim 21, wherein the fastening part is positioned on each of four corners of the functional member.

23. The functional member-attached glass window according to claim 22, wherein the end surface includes a first end surface and a second end surface formed in directions perpendicular to each other, and the fastening part includes a first contact portion configured to contact with the first end surface and the second end surface at one of the four corners of the functional member, and a second contact portion configured to contact with the principal surface of the functional member such that the functional member is sandwiched between the second contact portion and a respective one of the spacers.

24. The functional member-attached glass window according to claim 23, further comprising:
a link member positioned along an upper edge portion of the functional member,
wherein the fastening part is positioned on each of an upper left corner and an upper right corner of the functional member, and the fastening part on the upper left corner of the functional member and the fastening part on the upper right corner of the functional member are linked by the link member.

25. The functional member-attached glass window according to claim 24, further comprising:
  a second link member positioned along a lower edge portion of the functional member,
  wherein the fastening part is positioned on each of a lower left corner and a lower right corner of the functional member, and the fastening part on the lower left corner of the functional member and the fastening part on the lower right corner of the functional member are linked by the second link member.

* * * * *